(12) United States Patent
Sztuk et al.

(10) Patent No.: US 12,073,015 B1
(45) Date of Patent: *Aug. 27, 2024

(54) SYSTEMS AND METHODS FOR CALIBRATING EYE TRACKING

(71) Applicant: Meta Platforms Technologies, LLC, Menlo Park, CA (US)

(72) Inventors: Sebastian Sztuk, Menlo Park, CA (US); Karol Constantine Hatzilias, Sammamish, WA (US); Kirk Erik Burgess, Newark, CA (US); Javier San Agustin Lopez, Deba (ES)

(73) Assignee: Meta Platforms Technologies, LLC, Menlo Park, CA (US)

( * ) Notice: Subject to any disclaimer, the term of this patent is extended or adjusted under 35 U.S.C. 154(b) by 172 days.

This patent is subject to a terminal disclaimer.

(21) Appl. No.: 17/569,100

(22) Filed: Jan. 5, 2022

Related U.S. Application Data

(63) Continuation of application No. 16/663,115, filed on Oct. 24, 2019, now Pat. No. 11,269,406.

(51) Int. Cl.
| | |
|---|---|
| *G06F 3/01* | (2006.01) |
| *G02B 27/00* | (2006.01) |
| *G02B 27/01* | (2006.01) |
| *G06V 40/19* | (2022.01) |

(52) U.S. Cl.
CPC ......... *G06F 3/013* (2013.01); *G02B 27/0093* (2013.01); *G02B 27/0172* (2013.01); *G06V 40/19* (2022.01); *G02B 2027/0187* (2013.01)

(58) Field of Classification Search
CPC .......................................................... G06F 3/13
USPC ............................................................ 348/78
See application file for complete search history.

(56) References Cited

U.S. PATENT DOCUMENTS

| | | | |
|---|---|---|---|
| 10,838,492 | B1 | 11/2020 | Whitmire et al. |
| 2016/0246367 | A1 | 8/2016 | Tungare et al. |
| 2019/0056785 | A1 | 2/2019 | Suk |
| 2019/0179409 | A1 | 6/2019 | Jones et al. |

*Primary Examiner* — Amir Shahnami
(74) *Attorney, Agent, or Firm* — Foley & Lardner LLP

(57) ABSTRACT

A method for calibrating eye tracking data for a head wearable optical device includes receiving eye tracking data from an imaging device oriented towards a combiner. The method includes determining a gaze direction of an eye of a user based on the eye tracking data. The method includes receiving calibration data from the imaging device that includes an indication of positions of one or more calibration indicators. The method includes determining the gaze direction based at least in part on the calibration data received from the imaging device (or factors adjusted by the calibration data).

20 Claims, 6 Drawing Sheets

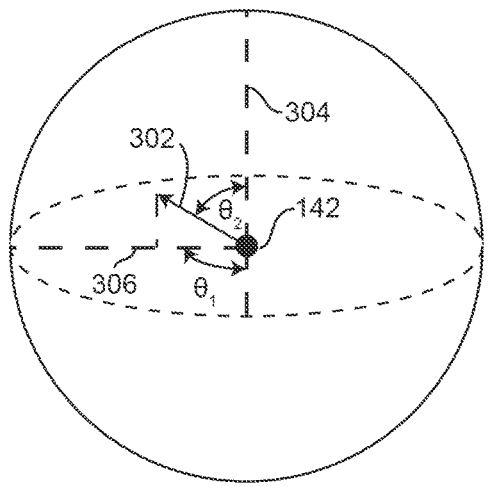
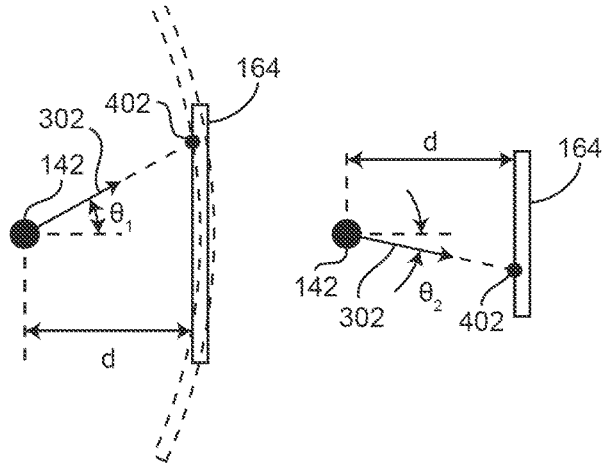
FIG. 5　　FIG. 6　　FIG. 7
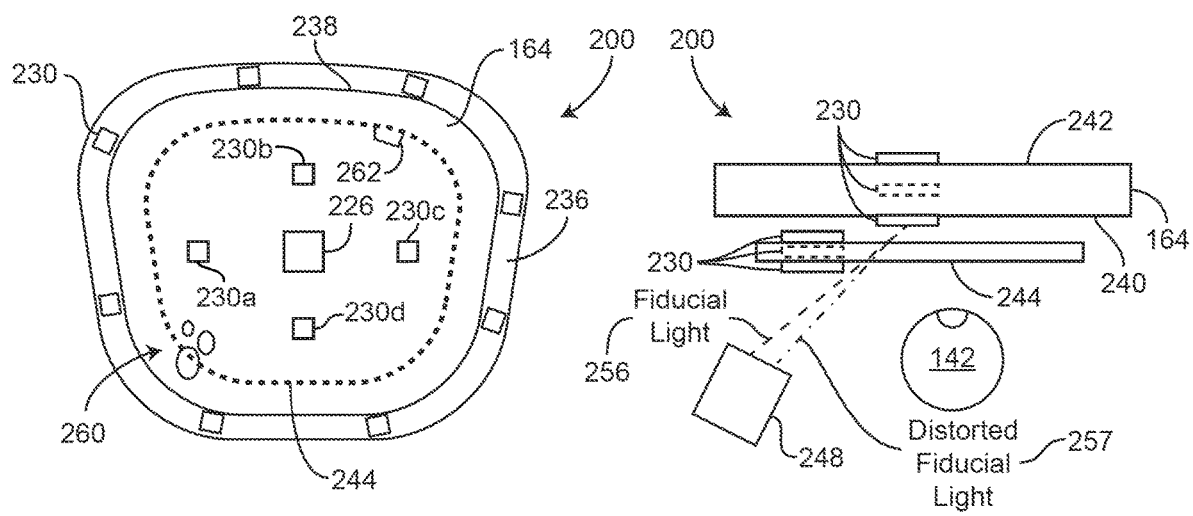
FIG. 8　　FIG. 9

SYSTEMS AND METHODS FOR CALIBRATING EYE TRACKING

CROSS-REFERENCE TO RELATED PATENT APPLICATION

This application is a continuation of U.S. patent application Ser. No. 16/663,115, filed Oct. 24, 2019, the entire disclosure of which is incorporated by reference herein.

FIELD OF THE DISCLOSURE

The present disclosure relates generally to display systems. More particularly, the present disclosure relates to systems and methods for calibrating eye tracking used in display systems.

BACKGROUND

The present disclosure relates generally to augmented reality (AR) and/or virtual reality (VR) systems. AR and VR systems can be used to present various images, including three-dimensional (3D) images, to a user. For example, AR or VR headsets can be used to present images to the user in a manner that is overlaid on a view of a real world environment or that simulates a virtual environment. To render convincing, life-like AR/VR images, the AR/VR systems can use eye tracking to track the user's eye and accordingly present images.

SUMMARY

One implementation of the present disclosure is related to a head mounted display, according to some embodiments. The head mounted display can include one or more fiducials, an imaging device, and processing circuitry. The one or more fiducials can be positioned about a combiner. The imaging device may be configured to receive light associated with an eye of a user and provide image data for eye tracking. The processing circuitry can be configured to receive the image data from the imaging device and determine an indication of one or more positions of the one or more fiducials in the image data relative to a reference position. The processing circuitry may be configured to determine or calibrate a gaze direction based at least in part on the indication to account for a change in at least one of a position or an orientation of the imaging device relative to the combiner.

Another implementation of the present disclosure is related to a method for calibrating eye tracking data for a head mounted display, according to some embodiments. The method can include receiving first data from an imaging device. The method can include determining calibration data from the imaging device. The calibration data may include an indication of positions of fiducials on a combiner of the head mounted display. The method can include determining a gaze direction at least in part using the calibration data to account for at least one of a change in position or a change in orientation of a combiner relative to the imaging device.

Another implementation of the present disclosure is related to a head mounted display, according to some embodiments. The head mounted display can include a prescription lens insert, one or more fiducials, an imaging device, and processing circuitry. The prescription lens insert can be positioned between a user's eye and an image displayed by the head mounted display. The one or more fiducials can be disposed on the head mounted display. The imaging device can be configured to obtain image data. The processing circuitry can be configured to receive the image data from the imaging device. The processing circuitry can also be configured to determine a gaze direction of the user's eye based at least in part on the image data, and a distortion map associated with the prescription lens insert. The distortion map is used to account for a distortion of light passing through the prescription lens insert.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings:

FIG. 5 is a spherical coordinate system showing a gaze vector of a user's eye, according to some embodiments.

FIG. 6 is a top view of the gaze vector of FIG. 3 directed towards a display screen, according to some embodiments.

FIG. 7 is a side view of the gaze vector of FIG. 3 directed towards a display screen, according to some embodiments.

FIG. 8 is a schematic diagram of a portion of the HMD system of FIG. 2 including a prescription lens insert, according to some embodiments.

FIG. 9 is a schematic diagram of the TIMID system of FIG. 8 showing distortion of light passing through the prescription lens insert, according to some embodiments.

DETAILED DESCRIPTION

Overview

Referring generally to the FIGURES, systems and methods for calibrating eye tracking are shown, according to some embodiments. In some embodiments, an HMD includes an imaging device that is oriented towards a combiner of the HMD. Various fiducials (e.g., active light emitting devices and/or passive elements) can be placed on the combiner. The passive elements are reflective elements in some embodiments. The imaging device can have a field of view such that the fiducials are viewable by the imaging device. The imaging device can provide sensor data (e.g., calibration data and/or eye tracking data) to processing circuitry. The processing circuitry may use the sensor data to determine deformation or change in orientation/position of the imaging device relative to the display. In some embodiments, the processing circuitry may analyze the sensor data obtained by the imaging device, identify locations of the fiducials, and track the locations of the fiducials to determine changes in position and/or orientation of the combiner relative to the imaging device. The processing circuitry can adjust eye tracking (e.g., a gaze vector, a gaze location, a gaze position, eye position, etc.) to account for the changes in the position and/or orientation of the combiner relative to the imaging device. In some embodiments, if the position and/or orientation of the combiner relative to the imaging device deviates by a threshold amount or more, the HMD notifies the user that the HMD should be sent in for calibration.

In some embodiments, the HMD can also accommodate prescription lens inserts which may be field-swappable. The prescription lens inserts can include fiducials or markers on an eye-facing surface of the lens. The imaging device and the processing circuitry can use the fiducials or markers to identify a location of the lens relative to the imaging device. The processing circuitry may detect various magnification parameters of the lens, or may receive various parameters of the lens (e.g., from a radio frequency identification tag embedded in the lens, from a user input, etc.). The processing circuitry can obtain a distortion map or a distortion profile to account for distortion caused by the lens. The processing circuitry can calibrate the eye tracking to account for the distortion caused by the lens.

Virtual Reality or Augmented Reality System

Figure 1:
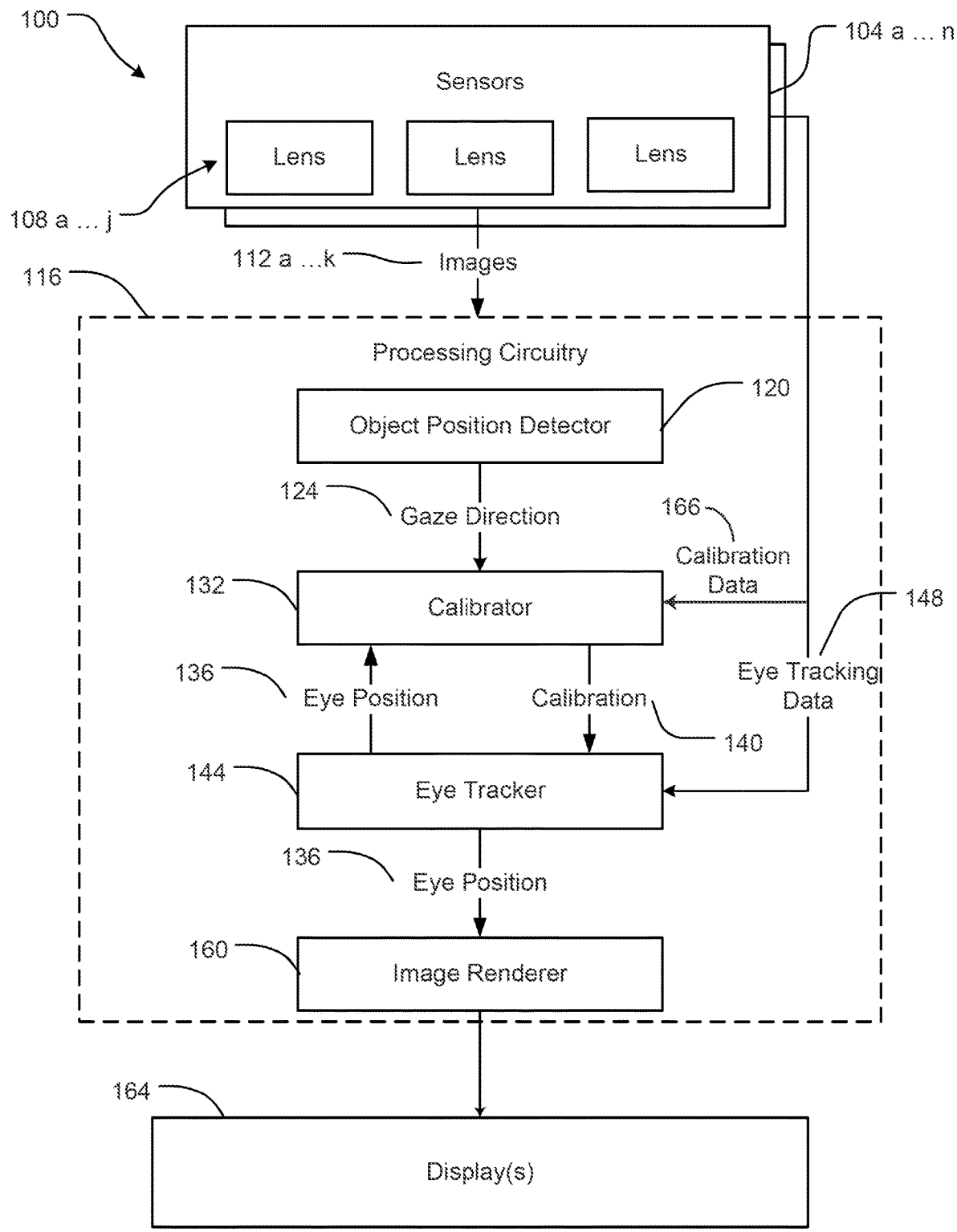
FIG. 1 is a block diagram of a display system, according to some embodiments.

Referring now to FIG. 1, a system 100 can include a plurality of sensors 104a . . . n, processing circuitry 116, and one or more displays 164. System 100 can be implemented using HMD system 200 described with reference to FIG. 2. System 100 can be implemented using the computing environment described with reference to FIG. 4. System 100 can incorporate features of and be used to implement features of virtual reality (VR) systems. At least some of processing circuitry 116 can be implemented using a graphics processing unit (GPU). The functions of processing circuitry 116 can be executed in a distributed manner using a plurality of processing units.

Processing circuitry 116 may include one or more circuits, processors, and/or hardware components. Processing circuitry 116 may implement any logic, functions or instructions to perform any of the operations described herein. Processing circuitry 116 can include any type and form of executable instructions executable by any of the circuits, processors or hardware components. The executable instructions may be of any type including applications, programs, services, tasks, scripts, libraries processes and/or firmware. Any of object position detector 120, calibrator 132, eye tracker 144, or image renderer 160 may be any combination or arrangement of circuitry and executable instructions to perform their respective functions and operations. At least some portions of processing circuitry 116 can be used to implement image processing executed by sensors 104.

Sensors 104a . . . n can be image capture devices or cameras, including video cameras. Sensors 104a . . . n may be cameras that generate images of relatively low quality (e.g., relatively low sharpness, resolution, or dynamic range), which can help reduce the SWAP of system 100. For example, sensors 104a . . . n can generate images having resolutions on the order of hundreds of pixels by hundreds of pixels. At the same time, the processes executed by system 100 as described herein can be used to generate display images for presentation to a user that have desired quality characteristics, including depth characteristics.

Sensors 104a . . . n (generally referred herein as sensors 104) can include any type of one or more cameras. The cameras can be visible light cameras (e.g., color or black and white), infrared cameras, or combinations thereof. Sensors 104a . . . n can each include one or more lenses 108 a . . . j (generally referred herein as lens 108). In some embodiments, sensor 104 can include a camera for each lens 108. In some embodiments, sensor 104 include a single camera with multiple lenses 108 a . . . j. In some embodiments, sensor 104 can include multiple cameras, each with multiple lenses 108. The one or more cameras of sensor 104 can be selected or designed to be a predetermined resolution and/or have a predetermined field of view. In some embodiments, the one or more cameras are selected and/or designed to have a resolution and field of view for detecting and tracking objects, such as in the field of view of a HMD for augmented reality. The one or more cameras may be used for multiple purposes, such as tracking objects in a scene or an environment captured by the image capture devices and performing the calibration techniques described herein.

The one or more cameras of sensor 104 and lens 108 may be mounted, integrated, incorporated or arranged on an HMD to correspond to a left-eye view of a user or wearer of the HMD and a right-eye view of the user or wearer. For example, an HMD may include a first camera with a first lens mounted forward-facing on the left side of the HMD corresponding to or near the left eye of the wearer and a second camera with a second lens mounted forward-facing on the right-side of the HMD corresponding to or near the right eye of the wearer. The left camera and right camera may form a front-facing pair of cameras providing for stereographic image capturing. In some embodiments, the HMD may have one or more additional cameras, such as a third camera between the first and second cameras an offers towards the top of the HMD and forming a triangular shape between the first, second and third cameras. This third camera may be used for triangulation techniques in performing the depth buffer generations techniques of the present solution, as well as for object tracking.

System 100 can include a first sensor (e.g., image capture device) 104a that includes a first lens 108a, the first sensor 104a arranged to capture a first image 112a of a first view, and a second sensor 104b that includes a second lens 108b, the second sensor 104b arranged to capture a second image 112b of a second view. The first view and the second view may correspond to different perspectives, enabling depth information to be extracted from the first image 112a and second image 112b. For example, the first view may correspond to a left eye view, and the second view may correspond to a right eye view. System 100 can include a third sensor 104c that includes a third lens 108c, the third sensor 104c arranged to capture a third image 112c of a third view. As described with reference to FIG. 2, the third view may correspond to a top view that is spaced from an axis between the first lens 108a and the second lens 108b, which can enable system 100 to more effectively handle depth information that may be difficult to address with the first sensor 104a and second sensor 104b, such as edges (e.g., an edge of a table) that are substantially parallel to the axis between the first lens 108a and the second lens 108b.

Light of an image to be captured by sensors 104a . . . n can be received through the one or more lenses 108 a . . . j. Sensors 104a . . . n can include sensor circuitry, including but not limited to charge-coupled device (CCD) or complementary metal-oxide-semiconductor (CMOS) circuitry, which can detect the light received via the one or more lenses 108a . . . j and generate images 112a . . . k based on the received light. For example, sensors 104a . . . n can use the sensor circuitry to generate first image 112a corresponding to the first view and second image 112b corresponding to the second view. The one or more sensors 104a . . . n can provide images 112a . . . k to processing circuitry 116. The one or more sensors 104a . . . n can provide images 112a . . . k with a corresponding timestamp, which can facilitate synchronization of images 112a . . . k when image processing is executed on images 112a . . . k, such as to identify particular first the second images 112a, 112b representing first and second views and having the same timestamp that should be compared to one another to calculate gaze information.

Figure 2:
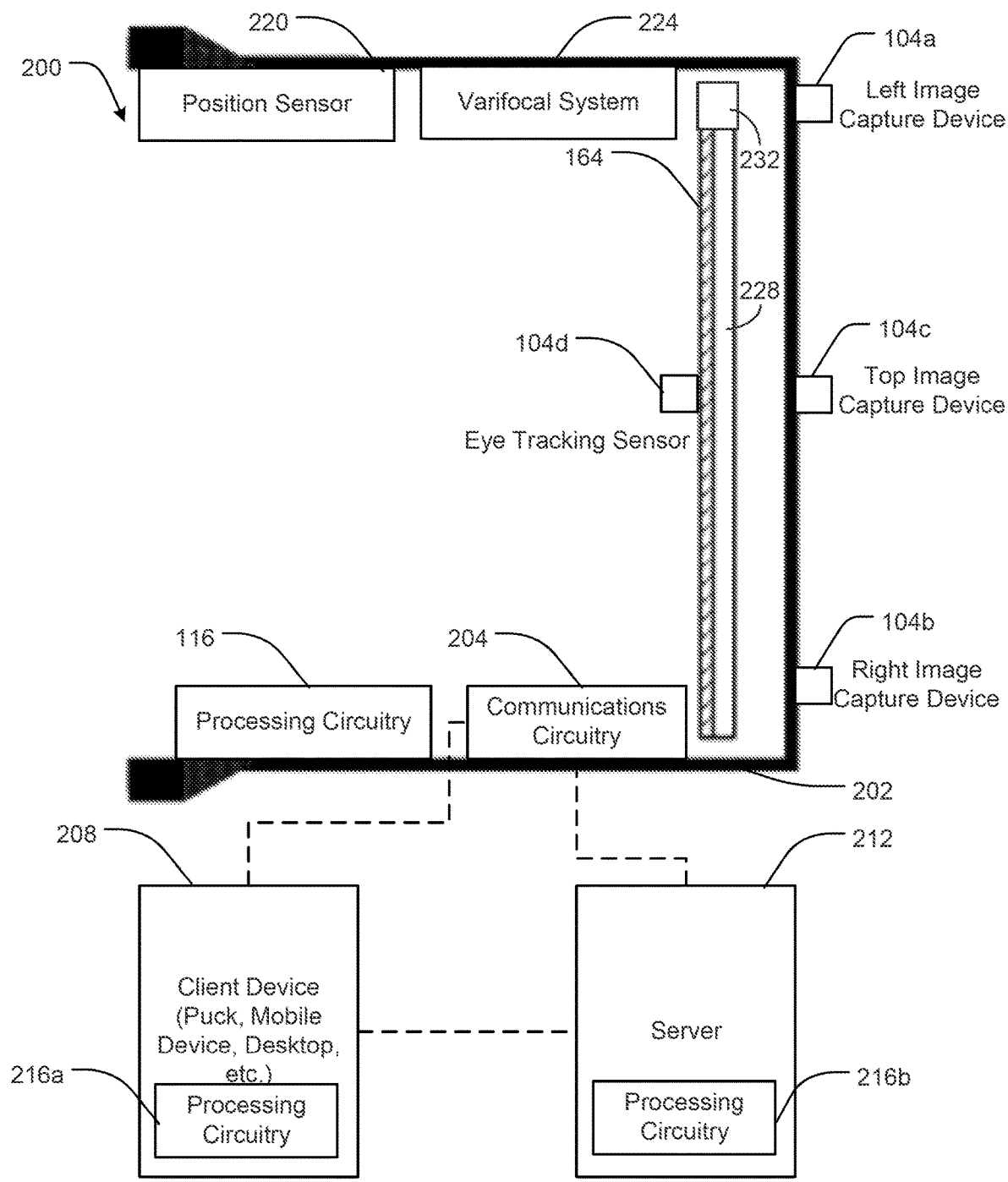
FIG. 2 is a schematic diagram of a head-mounted display (HMD) system, according to some embodiments.

Sensors 104 can include eye tracking sensors 104 or head tracking sensors 104 that can provide information such as positions, orientations, or gaze directions of the eyes or head of the user (e.g., wearer) of an HMD. In some embodiments, sensors 104 are inside out tracking cameras configured to provide images for head tracking operations. Sensors 104 can be eye tracking sensors 104 that provide eye tracking data 148, such as data corresponding to at least one of a position or an orientation of one or both eyes of the user. Sensors 104 can be oriented in a direction towards the eyes of the user (e.g., as compared to sensors 104 that capture images of an environment outside of the HMD). For example, sensors 104 can include at least one fourth sensor 104d (e.g., as illustrated in FIG. 2) which can be oriented towards the eyes of the user to detect sensor data regarding the eyes of the user.

In some embodiments, sensors 104 output images of the eyes of the user, which can be processed to detect an eye position or gaze direction (e.g., first gaze direction) of the eyes. In some embodiments, sensors 104 process image data regarding the eyes of the user, and output the eye position or gaze direction based on the image data. In some embodiments, sensors 104 optically measure eye motion, such as by emitting light (e.g., infrared light) towards the eyes and detecting reflections of the emitted light.

As discussed further herein, an eye tracking operation can include any function, operation, routine, logic, or instructions executed by system 100 or components thereof to track data regarding eyes of the user, such as positions or orientations (e.g., gaze directions) of the eyes of the user as the eyes of the user move during use of the HMD. For example, the eye tracking operation can be performed using at least one of one or more sensors 104 or eye tracker 144. For example, the eye tracking operation can process eye tracking data 148 from sensor 104 to determine an eye position 136 of eye(s) of the user. In some embodiments, the eye tracking operation can be performed using an eye tracker 144 that is implemented using a portion of processing circuitry 116 that is coupled with, mounted to, integral with, implemented using a same circuit board as, or otherwise provided with the one or sensors 104 that detect sensor data regarding the eyes of the user (and may be implemented using different processing hardware than at least one of object position detector 120, calibrator 132, or image renderer 160). In some embodiments, the eye tracking operation can be performed using an eye tracker 144 that receives sensor data by a wired or wireless connection from the one or more sensors 104 that are configured to detect sensor data regarding the eyes of the user (e.g., images of the eyes of the user); for example, eye tracker 144 can be implemented using the same processing hardware as at least one of object position detector 120, calibrator 132, or image renderer 160. Various such combinations of sensor hardware of sensors 104 and/or processing hardware of processing circuitry 116 may be used to implement the eye tracking operation.

Eye tracker 144 can generate eye position 136 in various manners. For example, eye tracker 144 can process the eye tracking data 148 to identify one or more pixels representing at least one of a position or an orientation of one or more eyes of the user. Eye tracker 144 can identify, using the eye tracking data 148, eye position 136 based on pixels corresponding to light (e.g., light from sensors 104, such as infrared or near-infrared light from sensors 104, such as 850 nm light eye tracking) reflected by the one or more eyes of the user. Eye tracker 144 can use light from various illumination sources or reflections in the HMD or AR system, such as from waveguides, combiners, or lens cameras. Eye tracker 144 can determine eye position 136 or gaze direction by determining a vector between a pupil center of one or more eyes of the user and a corresponding reflection (e.g., corneal reflection). Eye position 136 can include position data such as at least one of a position or an orientation of each of one or more eyes of the user. The position data can be in three-dimensional space, such as three-dimensional coordinates in a Cartesian, spherical, or other coordinate system. Eye position 136 can include position data including a gaze direction of one or more eyes of the user.

In some embodiments, eye tracker 144 includes a machine learning model. The machine learning model can be used to generate eye position 136 based on eye tracking data 148. For example, the eye tracking data 148 can be applied as an input to the machine learning model, which can output eye position 136 (or a gaze direction of eye position 136). The machine learning model can be trained using training data that include historical eye tracking data 148 and corresponding historical or labeled eye positions 136, such as eye positions 136 that were determined to correspond to the eye tracking data 148. The machine learning model can be continuously updated using the eye tracking data 148 to enable continuous calibration of the eye tracking operation. The machine learning model can be trained by monitoring a difference between candidate output generated by the machine learning model and the historical eye positions 136, and modifying the machine learning model to reduce the difference. For example, an objective function or cost function can be evaluated using the difference, and the machine learning model can be modified using the objective function or cost function. In some embodiments, the machine learning model includes a neural network. The neural network can include a plurality of layers each including one or more nodes (e.g., neurons, perceptrons), such as a first layer (e.g., an input layer), a second layer (e.g., an output layer), and one or more hidden layers. The neural network can include characteristics such weights and biases associated with computations that can be performed between nodes of layers, which processing circuitry 116 can modify to train the neural network using the training data.

Sensors 104 can capture images 112 of an environment around sensors 104. For example, sensors 104 can capture images 112 of an environment in or around a field of view of the user of the HMD. Images 112 can be representations of the environment, such as color or grayscale array or matrix of pixels representing parameters of light captured from the environment (e.g., color, brightness, intensity). The environment can be an indoor or outdoor environment, including both natural and man-made structures, terrain, or other objects, including sky, clouds, roads, buildings, streets, pedestrians, or cyclists. The environment can include one or more objects (e.g., real-world objects), which can be represented by images 112 captured by the sensors.

Processing circuitry 116 can include an object position detector 120. Object position detector 120 can receive image 112 from sensors 104. Object position detector 120 can process image 112 or portions thereof to detect one or more objects represented by image 112. For example, object position detector 120 can detect or identify objects represented by image 112 by processing elements of image 112 such as pixels or groups of pixels, such as by processing pixels or groups of pixels indicating colors, shapes, edges, contrast between pixels or groups of pixels, and spatial relationships between pixels. Object position detector 120 can detect objects by executing spatial filters, segmentation, or machine learning models trained to detect objects. Object position detector 120 can identify candidate objects from image 112, such as groups of pixels representing edges, compare the candidate objects to one or more template objects (e.g., template objects or features thereof in an object database), and identify the objects of image 112 based on candidate objects that match template objects. Object position detector 120 can apply various objection recognition algorithms or models to identify the objects. The objects can be real-world or simulated objects.

In some embodiments, object position detector 120 does not specifically identify a type, class, or other identifier of the object in image 112. Object position detector 120 can receive an indication from sensors 104 that the object has been detected by sensors 104. For example, object position detector 120 can receive an indication that a particular image 112 represents an object (in which case object position detector 120 can process image 112 to identify one or more pixels corresponding to the object). In some embodiments, the indication can include one or more pixels corresponding to the object.

In some embodiments, object position detector 120 detects the object using an object database that can include location data of various objects, buildings, structures, roads, or other indoor and outdoor features. For example, object position detector 120 can communicate with an object database mapping objects or features of objects to position data. The object database may also maintain semantic or textual information regarding objects, such as information regarding type, class, shape, color, size, or other features regarding the objects. The object database can be based on reconstruction of environments using image data (which can be updated using images 112 detected by sensors 104). The object database can be maintained, processed (e.g., to generate semantic or textual information or descriptors), and updated by a server remote from system 100, which system 100 can communicate with to access the object database. Object position detector 120 can receive data regarding the position of the HMD or AR system (e.g., from position sensor 220 described with reference to FIG. 2), and use the data to retrieve one or more candidate objects from the object database. Object position detector 120 can compare the sensor data to the one or more candidate objects and information maintained by the object database regarding the one or more candidate objects to identify the object (e.g., by matching the sensor data to the information received from the object database).

Object position detector 120 can determine a position of the object using information received from sensors 104, such as image 112 or the indication that image 112 represents an object. For example, object position detector 120 can identify one or more pixels corresponding to the object. In some embodiments, object position detector 120 determines the position of the object as a position in an image space of image 112, such as by assigning one or more pixels corresponding to the object as the position of the object. In some embodiments, object position detector 120 determines the position of the object as a position in three-dimensional space (e.g., real world space, AR or VR space, space in the environment around the HMD or AR system), such as by using depth information to determine the position of the object.

Object position detector 120 can determine a gaze direction using the position of the object, such as a gaze direction towards the position of the object. For example, object position detector 120 can identify an expected position of the eyes of the user, and determine a vector from the eyes of the user to the position of the object (or vice versa). In some embodiments, the expected position includes a left eye position and a right eye position, and object position detector 120 can determine the gaze direction using the left eye position and the right eye position, such as by averaging the left eye position and the right eye position, or averaging respective vectors from the left eye position to the position of the object and from the right eye position to the position of the object.

Processing circuitry 116 can detect that the user is gazing at the object. For example, processing circuitry 116 can use sensor data regarding the eyes of the user or scene understanding, such as contextual information, to detect that the user is gazing at the object (e.g., as compared to other objects that object position detector 120 has not determined the position of). Processing circuitry 116 can use any combination of sensor data to detect that the user is gazing at the object, such as by assigning a confidence score to each object regarding whether the user is gazing at the object, and determine the confidence score as a weighted average from contributions of the sensor data. Processing circuitry 116 can compare the confidence score to a threshold confidence, and detect that the user is gazing at the object responsive to the confidence score meeting or exceeding the threshold confidence. In some embodiments, processing circuitry 116 assigns a relatively higher confidence score to the object based on the object being one of at most a threshold number of objects in the scene (e.g., in a field of view of the HMD). For example, if the object is the only object in the scene, then there may be a greater likelihood that the user is gazing at the object. If the object is detected to be or include a face, such as another person speaking, there may be a greater likelihood that the user is gazing at the object.

Processing circuitry 116 can monitor positions of a plurality of objects, and detect whether the user is gazing at one or more of the plurality of objects, which can be used by calibrator 132 as described below to determine differences between gaze directions corresponding to the plurality of objects and gaze directions or eye positions 136 from eye tracker 144 to calibrate eye tracker 144.

In some embodiments, processing circuitry 116 can detect that the user is gazing at the object by identifying features of interest corresponding to the object, such as text data. Processing circuitry 116 can process image 112 representing the object to determine whether there is text data corresponding to the object. Processing circuitry 116 can detect that the user is gazing at the object responsive to identifying text data of the object. Processing circuitry 116 can detect that the user is gazing at the object based on the user providing the text data, such as if the user is writing. Similarly, processing circuitry 116 can detect that the user is gazing at the object based on detecting movement of one or more hands of the user in a particular manner, such as by detecting that the user is writing or drawing based on the movement of the hands and resulting changes in the scene (e.g., the movement of the hands corresponding to drawn or written objects in a vicinity of the hands).

Processing circuitry 116 can detect that the user is gazing at the object based on an interaction of the user with the object. For example, processing circuitry 116 can identify one or more hands of the user in images 112, monitor the one or more hands, and determine that the user is interacting with the object based on the one or more hands contacting or intersecting the object (e.g., at least one pixel corresponding to the one or more hands is within a threshold distance of the object, such as a threshold distance less than or equal to 10 pixels, less than or equal to 5 pixels, less than or equal to 2 pixels, or less than or equal to 1 pixel). For example, processing circuitry 116 can detect that the user is gazing at the object based on the user picking up a glass of water using image data of the sensor data indicating that hands of the user are interacting with the glass of water. Processing circuitry 116 can detect that the user is gazing at the object based on determining that the one or more hands of the user are moving the object, such as if the object is a controller, racket, or ball.

Processing circuitry 116 can detect that the user is gazing at the object based on the object being a moving object, such as by determining that the object has come into view of sensors 104. For example, processing circuitry 116 can determine that the object is present in an image received from sensors 104 and was not present in a previous image received from sensors 104. Processing circuitry 116 can determine whether the object is present by tracking one or more pixels corresponding to the object across images. Processing circuitry 116 can determine that the object is a moving object by detecting motion of the object, such as by determining that the one or more pixels corresponding to the object have different positions between images.

In some embodiments, processing circuitry 116 prompts the user to gaze at the detected object. For example, processing circuitry 116 can generate a prompt that includes at least one of a visual cue, an audio cue, or a text cue regarding the detected object. The prompt can indicate the position of the detected object. For example, the visual cue can be presented in a manner overlaying the detected object, which can guide the user to gaze at the detected object. The visual cue can include a color, change in brightness, outline, or other cue that can be used to direct attention to the object. Processing circuitry 116 can generate the prompt to include a plurality of visual cues, such as an animation.

Processing circuitry 116 can include a calibrator 132. Calibrator 132 can calibrate the eye tracking operation, such as by providing calibration instructions to at least one of eye tracker 144 or sensors 104 that are used for the eye tracking operation. Calibrator 132 can generate calibration instructions that can indicate a change in angle, orientation, position, or other parameters associated with eye tracking.

In some embodiments, calibrator 132 determines a gaze direction (e.g., second gaze direction) of the user based on information received from the eye tracking operation, such as an eye position 136 received from eye tracker 144. Eye position 136 can include at least one of a position or an orientation of one or more eyes of the user. Calibrator 132 can determine the gaze direction using eye position 136 by identifying one or more directions corresponding to a line of sight of the eye(s) of the user, such as directions that are perpendicular to a target point on one or both eyes of the user. Eye position 136 can include or indicate the gaze direction, in some embodiments.

Calibrator 132 can calibrate the eye tracking operation using the gaze direction 124 and the gaze direction determined based on at least eye position 136. For example, calibrator 132 can compare the gaze directions to determine a difference between the gaze directions. The difference can be a difference in angles, such as a difference in one or more angles of a coordinate system used to represent the gaze directions. The difference can be a vector, such as a vector resulting from comparing (e.g., subtracting) the gaze directions.

Calibrator 132 can calibrate the eye tracking operation by generating calibration 140 based on the difference and providing calibration 140 to eye tracker 144. For example, calibrator 132 can generate calibration 140 to cause eye tracker 144 to adjust one or more parameters that eye tracker 144 uses to generate eye position 136, such as parameters that eye tracker 144 applies to the eye tracking data 148 to determine eye position 136.

In some embodiments, calibrator 132 monitors a confidence score of at least one of scene understanding regarding the object or detecting that the user is gazing at the object. For example, the confidence score regarding the object can correspond to a confidence that the object is identified correctly (e.g., based on a match score of image data regarding the object to template image data). The confidence score of detecting that the user is gazing at the object can correspond to a confidence that the user is gazing at the object (e.g., based on the sensor data used to determine that the user is gazing at the object). Calibrator 132 can provide calibration 140 to eye tracker 144 responsive to the confidence score meeting or exceeding a respective threshold, which can enable calibrator 132 to selectively re-calibrate eye tracker 144 when there is a relatively high certainty that the object has been properly identified and that the user is gazing at the object.

In some embodiments, calibrator 132 uses vergence cues to determine how to calibrate eye tracker 144 or a varifocal system (e.g., varifocal system 224 described with reference to FIG. 2). For example, calibrator 132 can determine a vergence plane (e.g., first vergence plane) based on the gaze direction 124, determine a vergence plane (e.g., second vergence plane) based on the gaze direction corresponding to eye position 136, and calibrate eye tracker 144 based on a difference between the vergence planes. The vergence planes can correspond to planes perpendicular to the respective gaze directions (e.g., planes where lines of sight from the eyes would meet). Calibrator 132 can provide the vergence plane or instructions to adjust the vergence plane to varifocal system 224, enabling varifocal system 224 to modify a focus using the information received from calibrator 132.

Calibrator 132 can calibrate the eye tracking operation in a continuous or semi-continuous manner, such as by recalibrating the eye tracking operation periodically or responsive to changes in use of the HMD or AR system or the environment around the HMD or AR system. In some embodiments, calibrator 132 periodically calibrates the eye tracking operation. For example, calibrator 132 can initiate a timer responsive to providing calibration instructions to eye tracker 144, and re-calibrate or update the eye tracking operation, responsive to the timer exceeding a predetermined threshold time, using updated values of the gaze direction 124 and eye position 136.

In some embodiments, calibrator 132 monitors at least one of motion data of the HMD or AR system (e.g., using position sensor 220 described with reference to FIG. 2) or motion data of objects in view of the HMD or AR system.

Calibrator 132 can compare the motion data (e.g., position, orientation, velocity, acceleration data) to one or more respective thresholds, and re-calibrate or update the eye tracking operation using updated values of the gaze direction 124 and eye position 136 responsive to the motion data exceeding the one or more respective thresholds. Calibrator 132 can prompt the user to gaze at an object responsive to the motion data exceeding the one or more respective thresholds.

In some embodiments, calibrator 132 maintains a slip compensation model. The slip compensation model can monitor the difference between the gaze direction of eye position 136 and the gaze direction 124, and cause calibrator 132 to calibrate eye tracker 144 responsive to the difference exceeding a threshold. In some embodiments, the slip compensation model includes a machine learning model, such as a neural network. The slip compensation model can be trained to determine when to cause calibrator 132 to calibrate eye tracker 144, such as by training the slip compensation to determine the threshold. For example, training data can be provided to the slip compensation model that includes differences between gaze directions 124 and eye positions 136 (or gaze directions of eye positions 136) along with labeled indications of when the differences are too large, such as labeled indications corresponding to user feedback.

In some embodiments, calibrator 132 receives calibration data 166 from one of sensors 104a . . . n. In some embodiments, calibrator 132 is configured to track or identify locations/positions of one or more fiducials on display 164. Calibrator 132 can identify changes in the locations/positions (e.g., changes over time, a difference relative to baseline locations/positions, etc.) and use the changes in the locations/positions to calibrate the gaze vector or a gaze location (e.g., a location on display 164 that the user's gaze is directed towards).

Processing circuitry 116 can include an image renderer 160. Image renderer 160 can be a 3D image renderer. Image renderer 160 may use image related input data to process, generate and render display or presentation images to display or present on one or more display devices, such as via an HMD. Image renderer 160 can generate or create 2D images of a scene or view for display on display 164 and representing the scene or view in a 3D manner. The display or presentation data to be rendered can include geometric models of 3D objects in the scene or view. Image renderer 160 may determine, compute or calculate the pixel values of the display or image data to be rendered to provide the desired or predetermined 3D image(s), such as 3D display data for images 112 captured by sensor 104. Image renderer 160 can receive images 112 and receive eye position 136, and generate display images using images 112 and eye position 136, such as to determine where to locate augmented reality information for presentation by displays 164 based on eye position 136 (or gaze direction corresponding to eye position 136).

Image renderer 160 can render frames of display data to one or more displays 164 based on temporal and/or spatial parameters. Image renderer 160 can render frames of image data sequentially in time, such as corresponding to times at which images are captured by sensors 104. Image renderer 160 can render frames of display data based on changes in position and/or orientation to sensors 104, such as the position and orientation of the HMD. Image renderer 160 can render frames of display data based on left-eye view(s) and right-eye view(s) such as displaying a left-eye view followed by a right-eye view or vice-versa.

Image renderer 160 can generate the display images using motion data regarding movement of sensors 104a . . . n that captured images 112a . . . k. For example, sensors 104a . . . n may change in at least one of position or orientation due to movement of a head of the user wearing an HMD that includes sensors 104a . . . n (e.g., as described with reference to HMD system 200 of FIG. 2). Processing circuitry 116 can receive the motion data from a position sensor (e.g., position sensor 220 described with reference to FIG. 2). Image renderer 160 can use the motion data to calculate a change in at least one of position or orientation between a first point in time at which images 112a . . . k were captured and a second point in time at which the display images will be displayed, and generate the display images using the calculated change. Image renderer 160 can use the motion data to interpolate and/or extrapolate the display images relative to images 112a . . . k.

Although image renderer 160 is shown as part of processing circuitry 116, the image renderer may be formed as part of other processing circuitry of a separate device or component, such as the display device, for example within the HMD.

System 100 can include one or more displays 164. The one or more displays 164 can be any type and form of electronic visual display. The displays may have or be selected with a predetermined resolution and refresh rate and size. The one or more displays can be of any type of technology such as LCD, LED, ELED or OLED based displays. The form factor of the one or more displays may be such to fit within the HMD as glasses or goggles in which the display(s) are the leans within the frame of the glasses or goggles. Displays 164 may have a refresh rate the same or different than a rate of refresh or frame rate of processing circuitry 116 or image renderer 160 or sensors 104. Displays 164 can include one or more waveguides (e.g., waveguides 228 described with reference to FIG. 2), such that calibration of the eye tracking operation can be used to more accurately control operation of the waveguides using pupil locations indicated by the eye tracking.

Referring now to FIG. 2, in some implementations, an HMD system 200 (e.g., a head mounted display, a head mounted optical device, a head wearable optical device, a head wearable display, etc.) can be used to implement system 100. HMD system 200 can include an HMD body 202, a left sensor 104a (e.g., left image capture device), a right sensor 104b (e.g., right image capture device), and display 164. The HMD body 202 can have various form factors, such as glasses or a headset. Sensors 104a, 104b can be mounted to or integrated in the HMD body 202. The left sensor 104a can capture first images corresponding to a first view (e.g., left eye view), and the right sensor 104b can capture images corresponding to a second view (e.g., right eye view). In some embodiments, HMD system 200 is a head wearable optical device or display such as an eyepiece, glasses, goggles, etc., that a user may remove.

HMD system 200 can include a top sensor 104c (e.g., top image capture device). The top sensor 104c can capture images corresponding to a third view different than the first view or the second view. For example, the top sensor 104c can be positioned between the left sensor 104a and right sensor 104b and above a baseline between the left sensor 104a and right sensor 104b. This can enable the top sensor 104c to capture images with depth information that may not be readily available to be extracted from the images captured by the left and right sensors 104a, 104b. For example, it may be difficult for depth information to be effectively extracted from images captured by the left and right sensors 104a, 104b in which edges (e.g., an edge of a table) are parallel to a baseline between the left and right sensors 104a, 104b. The top sensor 104c, being spaced from the baseline, can capture the third image to have a different perspective, and thus enable different depth information to be extracted from the third image, than the left and right sensors 104a, 104b.

HMD system 200 can include processing circuitry 116, which can perform at least some of the functions described with reference to FIG. 1, including receiving sensor data from sensors 104a, 104b, and 104c as well as eye tracking sensors 104, and processing the received images to calibrate an eye tracking operation.

HMD system 200 can include communications circuitry 204. Communications circuitry 204 can be used to transmit electronic communication signals to and receive electronic communication signals from at least one of a client device 208 or a server 212. Communications circuitry 204 can include wired or wireless interfaces (e.g., jacks, antennas, transmitters, receivers, transceivers, wire terminals) for conducting data communications with various systems, devices, or networks. For example, communications circuitry 204 can include an Ethernet card and port for sending and receiving data via an Ethernet-based communications network. Communications circuitry 204 can communicate via local area networks (e.g., a building LAN), wide area networks (e.g., the Internet, a cellular network), and/or conduct direct communications (e.g., NFC, Bluetooth). Communications circuitry 204 can conduct wired and/or wireless communications. For example, communications circuitry 204 can include one or more wireless transceivers (e.g., a Wi-Fi transceiver, a Bluetooth transceiver, a NFC transceiver, a cellular transceiver). For example, communications circuitry 204 can establish wired or wireless connections with the at least one of client device 208 or server 212. Communications circuitry 204 can establish a USB connection with client device 208.

HMD system 200 can be deployed using different architectures. In some embodiments, the HMD (e.g., HMD body 202 and components attached to the HMD body 202) comprises processing circuitry 116 and is self-contained portable unit. In some embodiments, the HMD has portions of processing circuitry 116 that work in cooperation with or in conjunction with any type of portable or mobile computing device or companion device that has the processing circuitry or portions thereof, such as in the form of a staging device, a mobile phone or wearable computing device. In some embodiments, the HMD has portions of processing circuitry 116 that work in cooperation with or in conjunction with processing circuitry, or portions thereof, of a desktop computing device. In some embodiments, the HMD has portions of processing circuitry 116 that works in cooperation with or in conjunction with processing circuitry, or portions thereof, of a server computing device, which may be deployed remotely in a data center or cloud computing environment. In any of the above embodiments, the HMD or any computing device working in conjunction with the HMD may communicate with one or more servers in performing any of the functionality and operations described herein.

Client device 208 can be any type and form of general purpose or special purpose computing device in any form factor, such as a mobile or portable device (phone, tablet, laptop, etc.), or a desktop or personal computing (PC) device. In some embodiments, the client device can be a special purpose device, such as in the form of a staging device, which may have the processing circuitry or portions thereof. The special purpose device may be designed to be carried by the user while wearing the HMD, such as by attaching client device 208 to clothing or the body via any type and form of accessory attachment. Client device 208 may be used to perform any portion of the image and rendering processing pipeline described in connection with FIGS. 1 and 3. The HMD may perform some or other portions of the image and rendering processing pipeline such as image capture and rendering to display 164. The HMD can transmit and receive data with client device 208 to leverage client device 208's computing power and resources which may have higher specifications than those of the HMD.

Server 212 can be any type of form of computing device that provides applications, functionality or services to one or more client devices 208 or other devices acting as clients. In some embodiments, server 212 can be a client device 208. Server 212 can be deployed in a data center or cloud computing environment accessible via one or more networks. The HMD and/or client device 208 can use and leverage the computing power and resources of server 212. The HMD and/or client device 208 can implement any portion of the image and rendering processing pipeline described in connection with FIGS. 1 and 3. Server 212 can implement any portion of the image and rendering processing pipeline described in connection with FIG. 1, and in some cases, any portions of the image and rendering processing pipeline not performed by client device 208 or HMD. Server 212 may be used to update the HMD and/or client device 208 with any updated to the applications, software, executable instructions and/or data on the HMD and/or client device 208.

System 200 can include a position sensor 220. Position sensor 220 can output at least one of a position or an orientation of body 202. As image capture devices 104a, 104b, 104c can be fixed to body 202 (e.g., at predetermined locations relative to position sensor 220), position sensor 220 can output at least one of a position or an orientation of each sensor 104a, 104b, 104c. Position sensor 220 can include at least one of an inertial measurement unit (IU), an accelerometer, a gyroscope, or a magnetometer (e.g., magnetic compass).

System 200 can include a varifocal system 224. Varifocal system 224 can have a variable focal length, such that varifocal system 224 can change a focus (e.g., a point or plane of focus) as focal length or magnification changes. Varifocal system 224 can include at least one of a mechanical lens, liquid lens, or polarization beam plate. As discussed above, varifocal system 224 can be calibrated by processing circuitry 116 (e.g., by calibrator 132), such as by receiving an indication of a vergence plane from calibrator 132 which can be used to change the focus of varifocal system 224. In some embodiments, varifocal system 224 can enable a depth blur of one or more objects in the scene by adjusting the focus based on information received from calibrator 132 so that the focus is at a different depth than the one or more objects.

In some embodiments, display 164 includes one or more waveguides 228. Waveguides 228 can receive (e.g., in-couple) light corresponding to display images to be displayed by display 164 from one or more projectors 232, and output (e.g., out-couple) the display images, such as for viewing by a user of the HMD. Waveguides 228 can perform horizontal or vertical expansion of the received light to output the display images at an appropriate scale. Waveguides 228 can include one or more lenses, diffraction gratings, polarized surfaces, reflective surfaces, or combinations thereof to provide the display images based on the received light. Projectors 232 can include any of a variety of projection devices, such as LCD, LED, OLED, DMD, or LCOS devices, among others, to generate the light to be provided to the one or more waveguides 228. Projectors 232 can receive the display images from processing circuitry 116 (e.g., from image renderer 160). The one or more waveguides 228 can be provided through a display surface (e.g., glass), which can be at least partially transparent to operate as a combiner (e.g., combining light from a real world environment around the HMD with the light of the outputted display images). In some embodiments, display 164 is or includes a combiner (e.g., an optical combiner) configured to provide visual imagery to the user.

Operation of display 164 and components thereof, such as the one or more waveguides 228 or the one or more projectors 232, can be modified or controlled responsive to the calibration of the eye tracking operation. For example, processing circuitry 116 an cause the one or more projectors 232 to provide the display images using the one or more waveguides 228 based on a pupil location corresponding to each eye of the user based on the calibrated eye tracking operation. Processing circuitry 116 can use the calibrated eye tracking operation to correct uniformity of the one or more waveguides 228 so that the display images provided via the one or more waveguides 228 are aligned with the gaze directions of the eyes of the user.

Display 164 can perform foveated rendering based on the calibrated eye tracking operation, which can indicate a gaze point corresponding to the gaze direction generated by the eye tracking operation. For example, processing circuitry 116 can identify at least one of a central region of the FOV of display 164 (e.g., a plurality of pixels within a threshold distance from the gaze point) peripheral region of the FOV of display 164 based on the gaze point (e.g., a peripheral region represented by a plurality of pixels of the display images that are within a threshold distance of an edge of the display images or more than a threshold distance from the gaze point). Processing circuitry 116 can generate the display images to have a less quality (e.g., resolution, pixel density, frame rate) in the peripheral region than in the central region, which can reduce processing demand associated with operation of HMD system 200.

Tracking and Calibration System
System Architecture

Figure 3:
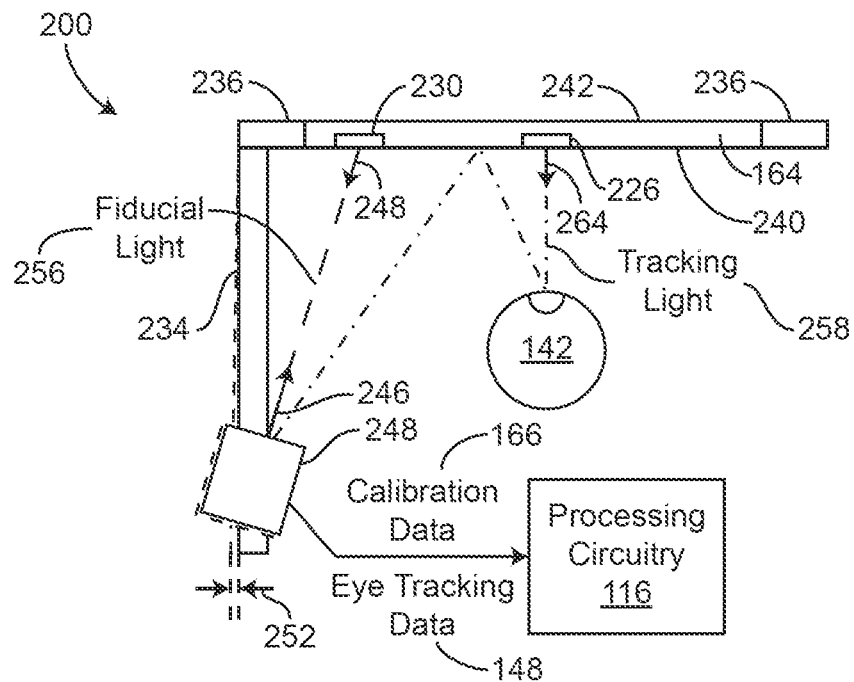
FIG. 3 is a schematic diagram of the TIMID system of FIG. 2 including one or more calibration indicators, according to some embodiments.

Referring now to FIG. 3, HMD system 200 is shown, according to some embodiments. In some embodiments, HMD system 200 includes a camera, an imaging devices, a sensor, a light detector, etc., shown as imaging device 248. Imaging device 248 is fixedly coupled (e.g., mounted, fastened, attached, connected, etc.) with a structural member, a temple arm, a temple, an ear piece, etc., shown as structural member 234, according to some embodiments. In some embodiments, structural member 234 is fixedly coupled or hingedly coupled with a frame member, another structural member, a nose piece, etc., shown as frame 236. Frame 236 can at least partially surround and fixedly couple with (e.g., structurally support) display 164. In some embodiments, structural member 234 extends in a direction that is substantially perpendicular to frame 236. Structural member 234 can include an end portion configured to rest upon or removably couple with a corresponding portion of the user (e.g., the user's ear) to secure HMD system 200 with the user's head.

It should be understood that while HMD system 200 is described herein as a head mounted system with a display device that actively displays imagery, any of the functionality, techniques, configuration, etc., of HMD system 200 may be applicable or advantageous to various eye-tracking systems (e.g., eye-tracking systems that are not head-mounted, eye tracking systems that do not include display 164, etc.). For example, HMD system 200 may include clear (e.g., transparent or translucent) glasses or eye pieces in place of display 164. In this way, the functionality of processing circuitry 116 can be applicable and/or advantageous to any eye tracking system or for calibrating eye tracking.

Imaging device 248 is oriented in a direction 246 towards display 164, according to some embodiments. In some embodiments, imaging device 248 is positioned on structural member 234 rearward of the user's eye 142. In some embodiments, imaging device 248 is positioned on structural member 234 substantially in line with or in front of eye 142. Imaging device 248 can be oriented in direction 246 or in substantially a same direction as eye 142. In some embodiments, imaging device 248 has a viewing angle or a field of view such that an entirety of display 164 (and at least partially frame 236) can be viewed by imaging device 248. In some embodiments, imaging device 248 is one of sensors 104a . . . n.

HMD system 200 includes one or more fiducials, locators, calibration locators, emitters, reflectors, indicators, etc., shown as calibration indicators 230, according to some embodiments. In some embodiments, calibration indicators 230 are used by processing circuitry 116 to determine a relative orientation and/or a relative position between imaging device 248 and display 164. In some embodiments, the relative orientation and/or relative position between imaging device 248 and display 164 is used to calibrate eye tracking for HMD system 200.

Calibration indicators 230 can be active or passive fiducials. In some embodiments, a combination of active and passive fiducials are used on HMD system 200. If calibration indicators 230 are active fiducials, calibration indicators 230 emit light that can be captured and detected by imaging device 248. In some embodiments, calibration indicators 230 are or include one or more light emitting devices (LEDs) configured to receive power and output or emit light. Calibration indicators 230 can be in-field Vertical-Cavity Surface-Emitting Lasers (VSCELs) configured to emit light that can be detected or sensed by imaging device 248. In some embodiments, calibration indicators 230 are configured to emit light that is outside of the visible spectrum (e.g., light with a wavelength greater than 740 nanometers, light with a wavelength less than 380 nanometers, etc.). In some embodiments, calibration indicators 230 are configured to emit infrared light or near-infrared light. In some embodiments, calibration indicators 230 are configured to emit light with a wavelength of 850 nanometers. In some embodiments, calibration indicators 230 are configured to emit light with a wavelength of 940 nanometers.

Calibration indicators 230 may be a particular size, positioned in particular locations, have a particular shape, pulse at a particular frequency, emit a particular wavelength of light, etc., so that imaging device 248 can detect and sense calibration indicators 230. In some embodiments, calibrator 132 stores known locations of each of calibration indicators 230 and check the known locations to identify the positions of calibration indicators 230. In some embodiments, calibration indicators 230 are within a field of view of imaging device 248. Advantageously, pulsing calibration indicators 230 may conserve battery power of system 200.

In some embodiments, calibration indicators 230 are configured to passively direct or reflect light towards imaging device 248 for detection and/or sensing by imaging device 248. In some embodiments, calibration indicators 230 are infrared reflective elements configured to reflect light having a wavelength outside of the visible spectrum. Calibration indicators 230 can receive light from nearby light emitting devices or ambient lighting and reflect or direct the light towards imaging device 248.

Any number of calibration indicators 230 can be used for detection by imaging device 248. In some embodiments, 4 to 5 calibration indicators 230 are used and positioned about display 164. In some embodiments, more than 5 calibration indicators 230 are used and are positioned about display 164. In some embodiments, less than 4 calibration indicators 230 are used and are positioned about display 164. In some embodiments, processing circuitry 116 is configured to activate calibration indicators 230 serially (e.g., one at a time if calibration indicators 230 are active fiducials) to determine or identify a source that is observed by imaging device 248.

Figure 4:
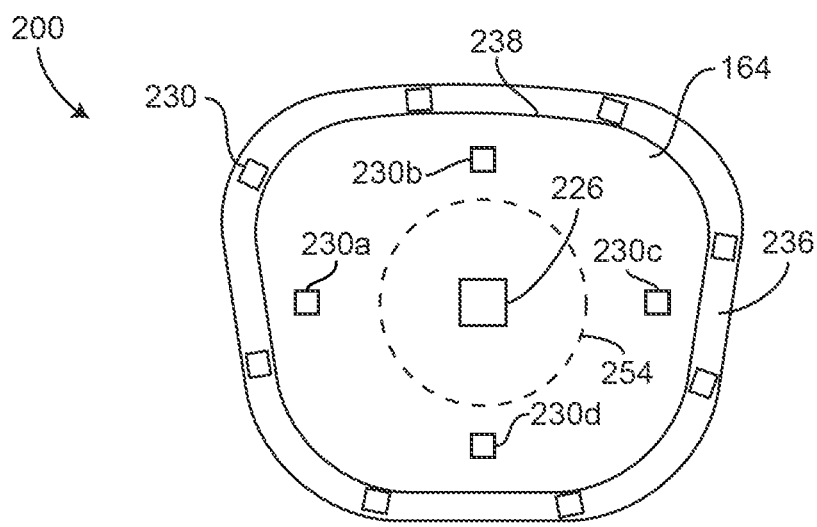
FIG. 4 is a schematic diagram of a portion of the HMD system of FIG. 2 including one or more calibration indicators, according to some embodiments.

Referring now to FIG. 4, calibration indicators 230 can be positioned outside of a viewing region 250 of the user's eye 142. For example, calibration indicators 230 can be placed about display 164 in area of display 164 that correspond to the user's peripheral vision. Advantageously, this reduces the amount of light provided to the user's eye 142 by calibration indicators 130 and reduces the likelihood that the user notices calibration indicators 130. In some embodiments, calibration indicators 130 are positioned on display 164 adjacent or near frame 236. In some embodiments, viewing region 250 represents a portion or area of display 164 that the user's gaze is normally directed towards.

Referring still to FIG. 4, display 164 is shown to include four calibration indicators 230. A first calibration indicator 230a is positioned at a left side of display 164, a second calibration indicator 230b is positioned at a top of display 164, a third calibration indicators 230c is positioned at a right side of display 164, and a fourth calibration indicator 230d is positioned at a bottom of display 164. Calibration indicators 230 can be positioned circumferentially along an outer edge of display 164. It should be understood that more or less than four calibration indicators as shown in FIG. 4 can be used on display 164. Calibration indicators 230 can be positioned about display 164 according to a pattern.

Referring still to FIG. 4, calibration indicators 230 can be positioned on or fixedly coupled with frame 236. In some embodiments, calibration indicators 230 are fixedly coupled with an inward facing surface (e.g., a surface that faces towards the user's eye 142) of frame 236. Frame 236 can at least partially surround and fixedly coupled with display 164 to facilitate providing structural support for display 164. In some embodiments, frame 236 is fixedly coupled or hingedly coupled with structural member 234 and provides structural support between structural member 234 and display 164. In some embodiments, calibration indicators 230 are positioned along substantially an entire perimeter of frame 236. In some embodiments, calibration indicators 230 are positioned along a portion of the entire perimeter of frame 236. Calibration indicators 230 can be evenly spaced along the perimeter of frame 236 or can be un-evenly spaced (e.g., according to a pattern) along the perimeter of frame 236.

Calibration indicators 230 are configured to direct, emit, reflect, etc., fiducial light 256 towards imaging device 248, according to some embodiments. In some embodiments, imaging device 248 is configured to detect or sense fiducial light 256 and provide processing circuitry 116 with calibration data 166 based on the detected fiducial light 256. In some embodiments, processing circuitry 116 is configured to use calibration data 166 to determine or identify a location of calibration indicators 230. In some embodiments, processing circuitry 116 is configured to use the identified location of calibration indicators 230 to calibrate eye tracking. In some embodiments, processing circuitry 116 is configured to track the location/positions of calibration indicators 230 over time to determine calibration or adjustments for the eye tracking. In some embodiments, processing circuitry 116 is configured to track the locations/positions of calibration indicators 230 in real-time based on calibration data 166 as obtained by imaging device 248 to adjust or calibrate the eye tracking (e.g., to calibrate eye tracking data 148 and/or gaze location 402 and/or gaze vector 302).

Referring particularly to FIGS. 3 and 4, HMD system 200 includes one or more light emitting devices, eye tracking devices, LEDs, etc., shown as light emitting device 226, according to some embodiments. Light emitting device 226 is configured to emit tracking light 258 in direction 264 towards the user's eye 142, according to some embodiments. In some embodiments, tracking light 258 is light with a wavelength outside of the visible spectrum. In some embodiments, tracking light 258 is light having a same or similar wavelength as fiducial light 256 (e.g., infrared light). In some embodiments, scattered tracking light 258 is reflected by calibration indicators 230 towards imaging device 248 (e.g., if calibration indicators 230 are passive fiducials).

Tracking light 258 can emitted by light emitting device 226 in direction 264 towards eye 142. Tracking light 258 may bounce, reflect, refract, etc., off of eye 142 and return in a direction towards display 164. Tracking light 258 can then be reflected, refracted, diffracted, etc., by display 164. In some embodiments, tracking light 258 is then directed towards imaging device 248. Imaging device 248 can detect or sense tracking light 258 to generate or obtain eye tracking data 148. In some embodiments, processing circuitry 116 uses eye tracking data 148 to determine or identify an orientation of eye 142 (e.g., to determine gaze vector 302 and/or gaze location 402). As the orientation of eye 142 changes, the path of tracking light 258 changes. Imaging device 248 can detect changes in the path of tracking light 258 and provide eye tracking data 148 to processing circuitry 116. Processing circuitry 116 uses eye tracking data 148 to determine gaze vector 302 and/or gaze location 402 (shown in FIGS. 5-7).

Referring particularly to FIGS. 8 and 9, system 200 can include a prescription lens, an RX insert, an RX lens, etc., shown as prescription lens 244. Prescription lens 244 can be positioned between the user's eye 142 and display 164. In some embodiments, light passing through prescription lens 244 is distorted, magnified, etc. Calibration indicators 230 can be positioned on an eye-facing surface 240 (e.g., an inwards facing surface, an inner surface, etc.) of display 164, an outwards facing surface 242 of display 164, between outwards facing surface 242 and eye-facing surface 240 (e.g., within display 164), embedded at eye-facing surface 240, embedded at outwards facing surface 242, etc. Likewise, calibration indicators 230 can be positioned on an eye-facing surface of prescription lens 244, an outwards facing surface of prescription lens 244, between the eye-facing surface and the outwards facing surface of prescription lens 244, embedded at either surface of prescription lens 244, etc. If prescription lens 244 is positioned between calibration indicators 230 and imaging device 248, a path that fiducial light 256 travels along may be distorted, shown as distorted fiducial light 257. Calibrator 132 can use a distortion map or a distortion profile to account for distorted fiducial light 257 when calibrating eye tracker 144.

In some embodiments, processing circuitry 116 is configured to use the distortion map or the distortion profile to unwrap image data that is obtained by imaging device 248 so that the image data can be used to determine the user's gaze direction. In some embodiments, the processing circuitry 116 is configured to use the distortion map or the distortion profile to adjust or change rendering of augmented content that is provided by display 164 to account for distortion caused by prescription lens 244 when the user views display 164 through prescription lens 244. Processing circuitry 116 (e.g., image renderer 160) may warp images provided by display 164 based on the distortion map or the distortion profile and based on gaze direction of the user to provide improved viewing quality.

In some embodiments, prescription lens 244 includes a radio frequency identification (RFID) tag 262. RFID tag 262 can be configured to wirelessly communicate with processing circuitry 116 to provide calibrator 132 with various parameters (e.g., magnification and/or distortion parameters, prescription parameters, etc.) of prescription lens 244. In some embodiments, calibrator 132 uses the various parameters received from RFID tag 262 to select a distortion map or a distortion profile. In some embodiments, prescription lens 244 includes an illumination layer as an eye-facing surface.

Calibration

Referring to FIGS. 1 and 3, a position and/or orientation of imaging device 248 relative to display 164 can change due to deformation (e.g., plastic deformation, elastic deformation, bending, twisting, etc.) of structural member 234 and/or frame 236, or any other structural members that couple imaging device 248 and display 164. For example, structural member 234 may move a distance 252 due to deformation (e.g., wear and use of system 200), thermal expansion, etc. If imaging device 248 changes orientation and/or position relative to display 164, the sensed or calculated eye position 136 (e.g., the gaze vector, the gaze location, etc.) may change such that eye position 136 is inaccurate. Calibrator 132 can use sensed locations of calibration indicators 230 to account for deformation of structural members of system 200 (or, more generally, to account for changes in position and/or orientation of imaging device 248 relative to display 164) and thereby improve the eye tracking. Calibrator 132 can determine one or more calibration parameters based on the sensed locations/positions of calibration indicators 230 and provide the calibration parameters to eye tracker 144 as calibration 140. Eye tracker 144 uses calibration 140 to adjust eye position 136 (e.g., gaze location 402, gaze vector 302, etc., shown in FIGS. 5-7) to account for the change in orientation and/or position between imaging device 248 and display 164.

Imaging device 248 captures sensor data and provides calibration data 166 and eye tracking data 148 to processing circuitry 116, according to some embodiments. In some embodiments, the sensor data is provided to both calibrator 132 and eye tracker 144, and calibrator 132 and eye tracker 144 identify calibration data 166 and eye tracking data 148 from the sensor data. In some embodiments, light emitting device 226 and calibration indicators 230 emit light out of phase with each other so that imaging device 248 and/or processing circuitry 116 can discern calibration data 166 and eye tracking data 148 from each other. For example, calibration indicators 230 can be triggered by a different pulse compared with light emitting device(s) 226 (e.g., every 10 seconds) to ensure system stability with temperature. In some embodiments, imaging device 248 is configured to view all of calibration indicators 230 and processing circuitry 116 (and/or imaging device 248) can check light intensity of calibration indicators 230 (and/or light emitting device(s) 226) to ensure that the light intensity is safe for the user's eyes 142. Processing circuitry 116 can operate any of the light emitting devices of system 200 to maintain a safe level of brightness for the user's eyes 142.

Eye tracker 144 is configured to receive eye tracking data 148 from imaging device 248 and determine eye position 136 (e.g., the gaze vector and/or the gaze location as described in greater detail below with reference to FIGS. 5-7). In some embodiments, eye tracker 144 determines eye position 136 based on tracking light 258 using any of the functionality described in greater detail above with reference to FIG. 1.

Calibrator 132 receives calibration data 166 from imaging device 248 and performs one or more image analysis operations to identify positions of calibration indicators 230, according to some embodiments. In some embodiments, calibrator 132 uses fiducial light 256 and/or distorted fiducial light 257 to identify the positions of calibration indicators 230 on display 164. Calibrator 132 can compare the positions of calibration indicators 230 to reference positions (e.g., known positions, reference locations, previously detected locations, etc.). In some embodiments, calibrator 132 tracks the positions of calibration indicators 230 over time. For example, calibrator 132 can store the calculated positions of calibration indicators 230 for every time calibration is performed. In this way, calibrator 132 can determine if the position and/or orientation of imaging device 248 has changed relative to display 164 over time and can determine the calibration parameters to adjust eye position 136 (to calibrate eye tracker 144) to account for the changes of the position and/or orientation of imaging device 248 relative to display 164.

Referring still to FIGS. 1 and 3, in some embodiments, calibrator 132 determines positions of calibration indicators 230 and compares the positions to corresponding baseline positions. The baseline positions are positions of each calibration indicator 230 assuming the orientation/position of imaging device 248 relative to display 164 has not changed (e.g., factory calibration settings, assuming display 164 and imaging device 248 are rigidly fixedly coupled, etc.), according to some embodiments. In some embodiments, calibrator 132 determines a change or a difference in current positions/locations of calibration indicators 230 relative to the reference or baseline positions. If the change or the difference exceeds a predetermined threshold amount (e.g., a percentage, a standard deviation, etc.), indicating that imaging device 248 has significantly changed orientation and/or position relative to display 164, calibrator 132 can update or change various calibration parameters (e.g., calibration 140) and provide the calibration parameters to eye tracker 144. In some embodiments, the calibration parameters are offset amounts or changes for eye position 136. Eye tracker 144 can receive calibration 140 (e.g., the calibration parameters) and adjust eye position 136 before providing eye position 136 to image renderer 160 to account for the change in orientation and/or position of imaging device 248 relative to display 164. Calibrator 132 can perform any of the functionality of object position detector 120 to identify the positions/locations of calibration indicators 230.

In some embodiments, calibrator 132 uses the positions/locations of calibration indicators 230 to determine an orientation and/or position of display 164 relative to imaging device 248. For example, calibrator 132 can use the identified positions/locations of calibration indicators 230 to calculate a centroid and to determine a location/orientation of display 164 relative to imaging device 248. Calibrator 132 can compare the location/orientation of display 164 relative to imaging device 248 to baseline or reference position/location and orientation to determine if display 164 and imaging device 248 have changed significantly in their position and orientation relative to each other. In some embodiments, calibrator 132 updates or adjusts calibration 140 based on the position and/or orientation of display 164 relative to imaging device 248.

In some embodiments, if the position and/or orientation of display 164 relative to imaging device 248 changes a maximum allowable amount or greater, calibrator 132 can determine that system 200 should be sent in for calibration (e.g., to a manufacturer, a calibration facility, etc.). Processing circuitry 116 can alert the user (e.g., with a visual alert, an aural alert, etc.) that system 200 should be sent in for calibration. In some embodiments, processing circuitry 116 also notifies server 212 that system 200 should be sent in for calibration.

The functionality of calibrator 132 is described in greater detail below with reference to FIG. 10, according to some embodiments. Advantageously, calibrator 132 facilitates improved eye tracking. Calibrator 132 can perform any of the calibration functionality described herein in real-time or at scheduled times. For example, calibrator 132 can be configured to perform the calibration at regular time intervals, when system 200 is powered up, in response to a user request, in response to a remote request, etc. In some embodiments, calibrator 132 performs calibration in response to eye tracker 144 determining that a convergence (e.g., inter-pupillary distance, IPD) between the user's left and right eyes 142 deviate a significant amount (e.g., a predetermined threshold amount or greater). If the convergence or the IPD between the user's left and right eyes 142 deviates a significant amount, this may indicate that the orientation and/or position of imaging device 248 relative to display 164 has changed enough to impact eye position 136 and that calibrator 132 should adjust the calibration parameters to account for the change in orientation and/or position. Advantageously, calibrator 132 can detect if system 200 was dropped by determining if the positions of calibration indicators 230 has changed significantly relative to a previous calibration or relative to a baseline. In some embodiments, calibrator 132 receives information from position sensor 220 and is configured to perform calibration in response to detecting a drop (e.g., in response to an acceleration of system 200 exceeding a threshold value). Advantageously, calibrator 132 facilitates improved eye tracking which can be used for foveated rendering to reduce computational power requirements and improve imagery displayed to the user.

Another advantage of system 200 is that system 200 may use imaging device 248 for both eye tracking as well as calibration. Other systems may use different imaging devices for eye tracking and calibration which requires extra hardware, additional costs, and additional points of possible failure. However, system 200 uses imaging device 248 to both obtain calibration data 166 as well as eye tracking data 148. This facilitates reduced hardware on system 200 which facilitates a lighter system 200 that is particularly advantageous for HMDs. Additionally, using imaging device 248 for both obtaining calibration data 166 and eye tracking data 148 facilitates reduced cost to manufacture system 200. In some embodiments, imaging device 248 is also used for AR tracking (e.g., to track physical environment surrounding the user).

Magnification Detection

In some embodiments, imaging device 248 is configured to detect magnification during use (e.g., when prescription lens 244 is inserted). For example, imaging device 248 can compare sensor data collected before the lens is inserted and after the lens is inserted to identify that the magnification or distortion of light passing from display 164 to imaging device 248 has changed. Calibrator 132 can use a different distortion profile/map in response to imaging device 248 detecting a change in magnification. In some embodiments, calibrator 132 uses the distortion profile/map to calibrate eye tracker 144. In some embodiments, if calibration indicators 230 are positioned on both display 164 and prescription lens 244, processing circuitry 116 can calibrate or determine the position of prescription lens 244 relative to display 164. Calibrator 132 can use the position of prescription lens 244 relative to display 164 when selecting or adjusting the distortion map/profile and for calibration.

Advantageously, since calibrator 132 is configured to select or identify distortion maps or distortion profiles for prescription lenses (e.g., prescription lens 244), system 200 can be used with field-swappable lenses, prescription or otherwise. Advantageously, system 200 can maintain accurate eye tracking despite magnification and/or distortion of fiducial light 256 caused by prescription lens 244.

Other Tracking Points

Referring particularly to FIGS. 1 and 8, it should be understood that while calibrator 132 is described as using calibration indicators 230 to determine and track orientation/position of imaging device 248 relative to display 164, calibrator 132 can also use an edge 238 between frame 236 and display 164 to calibrate eye tracker 144 (e.g., to calibrate eye position 136) or any other viewable portion of system 200. In some embodiments, calibrator 132 and/or imaging device 248 are configured to identify a location of edge 238. Calibrator 132 may track the position/location of edge 238 over time and/or compare the position/location of edge 238 to a reference (e.g., baseline) position. Calibrator 132 can use the positions/location of edge 238 or any other part of frame 236, structural member 234, etc., that can be tracked to determine orientation of imaging device 248 relative to display 164 and calibrate eye position 136.

Moisture Detection

Referring still to FIGS. 1 and 8, imaging device 248 can detect or identify water droplets 260 or moisture present on display 164. Processing circuitry 116 can use the sensor data received from imaging device 248 to identify that water droplets 260 are present on display 164. In some embodiments, processing circuitry 116 is configured to alert the user (e.g., by operating a visual alert device such as display 164 or an LED and/or by operating an aural alert device) that water droplets 260 are present on display 164 and that the user should clean display 164. In some embodiments, light with a specific wavelength is used in a droplet detection layer and emitted onto water droplets 260. Calibration indicators 230 can reflect the light emitted onto water droplets 260 to imaging device 248 to detect water droplets 260. In some embodiments, processing circuitry 116 may shut down the system or alarm the user if a drop is detected. Processing circuitry may shut down the system or alarm the user (e.g., by operating one or more light emitting devices, aural alert devices, etc.) for eye safety purposes.

Other Configuration of Calibration Indicators

Referring particularly to FIGS. 2, 3-4, and 8, some or all of calibration indicators 230 can be positioned or embedded on waveguides 228. Processing circuitry 116 (e.g., calibrator 132) and imaging device 248 can track the location and/or orientation of imaging device 248 relative to waveguides 228 to anchor an optical axis to imaging device 248. This can be used to correct/calibrate imaging device 248 or waveguides 228 positions during rendering (e.g., by image renderer 160).

Calibration Indicators Activation

Referring particularly to FIGS. 3-4 and 8-9, calibration indicators 230 can be operated by processing circuitry 116 to emit light for calibration (e.g., to collect calibration data 166). In some embodiments, calibration indicators 230 are activated to emit fiducial light 256 only when light emitting device(s) 226 are inactive. In some embodiments, calibration indicators 230 are configured to reflect light from another set of light emitting devices (other than light emitting device(s) 226) which are activated when light emitting device(s) 226 are inactive. In some embodiments, light emitting device(s) 226 are configured to emit light at different pulses or different wavelengths for separate eye tracking and calibration. For example, light emitting device(s) 226 can be configured to emit both tracking light 258 having a first wavelength or at a first pulse and also fiducial light 256 having a different wavelength, or at a different pulse. In some embodiments, fiducial light 256 (e.g., whether it be emitted by calibration indicators 230 if calibration indicators 230 are active, or by light emitting devices 226, or by other, separate, light emitting devices) is emitted out of phase with tracking light 258 such that processing circuitry 116 and/or imaging device 248 can discern between tracking light 258 and fiducial light 256. Separate light emitting devices or illuminators can be positioned about display 164, frame 236, structural member 234, etc., to emit fiducial light 256 such that calibration indicators 230 are sufficiently illuminated (e.g., if calibration indicators 230 are passive) and so that imaging device 248 can obtain calibration data 166 that calibrator 132 can use to identify the locations/positions of calibration indicators 230.

Gaze Vector and Gaze Location

Referring now to FIGS. 5-7, the gaze vector is shown in greater detail, according to some embodiments. Eye position 136 or the gaze vector as used by processing circuitry 116 is represented graphically in FIGS. 5-7 as gaze vector 302, according to some embodiments. It should be understood that while eye position 136 is represented in a spherical coordinate system, eye position 136 can also be represented in a Cartesian coordinate system, a polar coordinate system, a cylindrical coordinate system, etc., or any other coordinate system. Gaze vector 302 is used by processing circuitry 116 to determine a focal point or gaze location 402 of the user's eyes, according to some embodiments.

Referring particularly to FIG. 5, a spherical coordinate system includes gaze vector 302, and the user's eye (or eyes) 140. Eye 142 is shown as a center point of the spherical coordinate system, and gaze vector 302 extends radially outwards from eye 142, according to some embodiments. In some embodiments, a direction of gaze vector 302 is defined by one or more angles, shown as angle $\theta_1$ and angle $\theta_2$. In some embodiments, angle $\theta_1$ represents an angular amount between gaze vector 302 and a vertical axis 304. In some embodiments, angle $\theta_2$ represents an angular amount between gaze vector 302 and a horizontal axis 306. In some embodiments, vertical axis 304 and horizontal axis 306 are substantially perpendicular to each other and both extend through eye 142.

In some embodiments, eye tracker 144 of processing circuitry 116 is configured to determine values of both angle $\theta_1$ and angle $\theta_2$ based on eye tracking data 148. Eye tracker 144 can determine the values of angles $\theta_1$ and $\theta_2$ for both eyes 142, according to some embodiments. In some embodiments, eye tracker 144 determines the values of angles $\theta_1$ and $\theta_2$ and provides the angles to calibrator 132 the gaze vector.

Referring particularly to FIGS. 6 and 7 gaze vector 302 can be used to determine a location of a point of interest, a focal point, a gaze point, a gaze location, a point, etc., shown as gaze location 402. Gaze location 402 has a location on display 164, according to some embodiments. In some embodiments, gaze location 402 has an x location and a y location (e.g., a horizontal and a vertical location) on display 164. In some embodiments, gaze location 402 has a location in virtual space, real space, etc. In some embodiments, gaze location 402 has a two dimensional location. In some embodiments, gaze location 402 has a three-dimensional location. Gaze location 402 can have a location on display 164 relative to an origin or a reference point on display 164 (e.g., a center of display 164, a corner of display 164, etc.). Gaze location 402 and gaze vector 302 can be represented using any coordinate system, or combination of coordinate systems thereof. For example, gaze location 402 and/or gaze vector 302 can be defined using a Cartesian coordinate system, a polar coordinate system, a cylindrical coordinate system, a spherical coordinate system, a homogeneous coordinate system, a curvilinear coordinate system, an orthogonal coordinate system, a skew coordinate system, etc.

In some embodiments, eye tracker 144 is configured to use a distance d between the user's eye 142 and display 164. The distance d can be a known or sensed distance between the user's eye 142 and display 164, according to some embodiments. For example, sensors 104 can measure, detect, sense, identify, etc., the distance d between the user's eye 142 and display 164. In some embodiments, the distance d is a known distance based on a type or configuration of the HMD.

The distance d and the angles $\theta_1$ and $\theta_2$ can be used by eye tracker 144 to determine gaze vector 302. In some embodiments, eye tracker 144 uses the distance d and the angles $\theta_1$ and $\theta_2$ to determine the location of gaze location 402. In some embodiments, eye tracker 144 provides the distance d and the angles $\theta_1$ and $\theta_2$ to calibrator 132. Calibrator 132 can use the distance d and the angles $\theta_1$ and $\theta_2$ to determine the location of gaze location 402 relative to a reference point on display 164.

FIG. 6 is a top view of display 164 and the user's eye 142, according to some embodiments. FIG. 6 shows the angle $\theta_1$, according to some embodiments. Likewise, FIG. 7 is a side view of display 164 and the user's eye 142 and shows the angle $\theta_2$, according to some embodiments. Eye tracker 144 uses the distance d and the angles $\theta_1$ and $\theta_2$ to determine the position/location of gaze location 402, according to some embodiments. In some embodiments, image renderer 160 uses the position/location of gaze location 402 for foveated rendering. It should be understood that while display 164 is shown as a generally flat display screen, in some embodiments, display 164 is a curved, arcuate, etc., display screen. A rectangular display screen is shown for ease of illustration and description only. Accordingly, all references to "local positions," "local coordinates," "Cartesian coordinates,"

etc., of display 164 may refer to associated/corresponding angular values of angle $\theta_1$ and/or angle $\theta_2$.

Calibration Process

Figure 10:
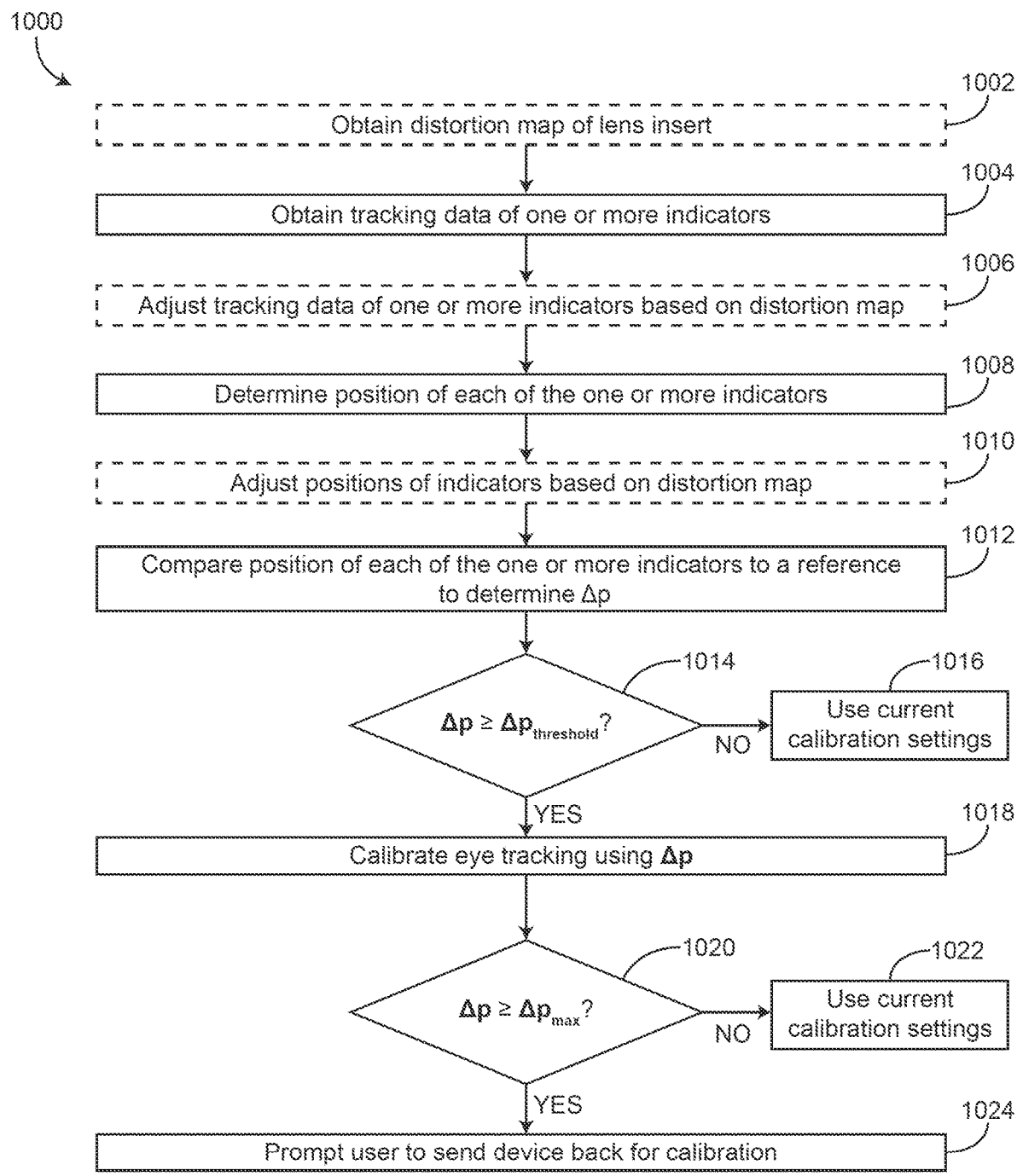
FIG. 10 is a flow diagram of a process for calibrating eye tracking data, according to some embodiments.

Referring now to FIG. 10, a process 1000 for calibrating eye tracking data includes steps 1002-1024, according to some embodiments. In some embodiments, process 1000 is performed by various portions of processing circuitry 116. In some embodiments, processing circuitry 116 is configured to perform process 1000 periodically (e.g., every 10 seconds) or at regular or non-regular time intervals. In some embodiments, processing circuitry 116 is configured to perform process 1000 in response to position sensor 220 indicating that the HMD (e.g., HMD system 200) has been dropped. For example, calibrator 132 can receive sensor data from position sensor 220 and perform process 1000 in response to an inertial measurement from position sensor 220 exceeding a predetermined threshold value. If the inertial measurement from position sensor 220 exceeds the predetermined threshold value, this may indicate that the HMD was dropped and that calibrator 132 should perform process 1000 to identify if the eye tracking needs to be calibrated to account for changes in orientation and/or position between imaging device 248 and display 164 which may have occurred when the HMD was dropped.

In some embodiments, process 1000 is performed to calibrate the eye tracking in response to a user input or in response to the user inserting prescription lens 254 (e.g., based on sensor feedback indicating that the user has inserted a prescription lens or based on a user input that the user has inserted a prescription lens). In some embodiments, processing circuitry 116 is configured to receive user inputs (e.g., through a user interface) and perform process 1000 in response to receiving the user input. In some embodiments, processing circuitry 116 is configured to perform process 1000 in response to determining that the user's eyes are not converging (e.g., in response to gaze location 402 of each eye being in different locations on display 164). In some embodiments, processing circuitry 116 is configured to perform process 1000 in response to receiving a remote command (e.g., from a remote server).

Process 1000 includes obtaining a distortion map of a prescription lens insert (step 1002), according to some embodiments. In some embodiments, step 1002 is optional. For example, step 1002 can be performed in response to processing circuitry 116 detecting that a prescription lens has been inserted or in response to a user input. In some embodiments, step 1002 is performed by receiving various parameters from an RFID tag (e.g., RFID tag 262) on the prescription lens (e.g., prescription lens 244). In some embodiments, step 1002 includes retrieving the distortion map or a distortion profile that corresponds to the inserted prescription lens from a database. In some embodiments, step 1002 is performed by calibrator 132. Calibrator 132 may use sensor data received from imaging device 248 to identify a type of prescription lens that is inserted. Calibrator 132 selects and retrieves the corresponding distortion map from the database for the inserted prescription lens. The distortion map or profile can be selected from a set of pre-existing distortion maps/profiles for various particular prescription lenses. In some embodiments, the distortion map includes known magnifications, distortions, changes in light path, etc., that occur as light passes through the prescription lens at various locations of the prescription lens.

Process 1000 includes obtaining tracking data of one or more indicators (e.g., fiducials) (step 1004), according to some embodiments. In some embodiments, step 1004 is performed by imaging device 248 and calibrator 132. In some embodiments, the tracking data is calibration data 166 received from imaging device 248. Imaging device 248 can capture the tracking data (i.e., calibration data 166) based on fiducial light 256 emitted by or reflected by calibration indicators 230. In some embodiments, calibrator 132 receives calibration data 166 from imaging device 248 and identifies or tracks locations/positions of each of calibration indicators 230.

Process 1000 includes adjusting the tracking data of the one or more indicators based on the distortion map (step 1006), according to some embodiments. In some embodiments, step 1006 is optional and is only performed if a prescription lens (e.g., prescription lens 244) is inserted between the user's eye 142 and calibration indicators 230. In some embodiments, step 1006 is performed by calibrator 132. In some embodiments, calibrator 132 uses the distortion map to account for the distortion, path change, etc., of fiducial light 256 due to prescription lens 244.

Process 1000 includes determining a position of each of the one or more indicators based on the tracking data (step 1008), according to some embodiments. In some embodiments, step 1008 is performed by calibrator 132 and/or by object position detector 120. In some embodiments, step 1008 includes determining a position $p_{indicator}$ of each of calibration indicators 230. The position $p_{indicator}$ can include an (x, y) or an (x, y, z) position of each of calibration indicators 230. In some embodiments, the position $p_{indicator}$ is expressed in spherical coordinates, Cartesian coordinates, cylindrical coordinates, etc. relative to imaging device 248. In some embodiments, the position $p_{indicator}$ is or includes a position of the corresponding calibration indicators 230 relative to imaging device 248. Calibrator 132 can use any image analysis techniques (e.g., a neural network) or tracking techniques to determine the position of calibration indicators 230 relative to imaging device 248.

Process 1000 includes adjusting the positions $p_{indicator}$ of the indicators (e.g., calibration indicators 230) based on the distortion map (step 1010), according to some embodiments. In some embodiments, the position $p_{indicator}$ is adjusted an offset amount $p_{offset}$ to account for distortion of fiducial light 256 (e.g., distorted fiducial light 257) due to prescription lens 244. In some embodiments, calibrator 132 is configured to determine an adjusted position $p_{indicator,adj}$ using:

$$p_{indicator,adj} = p_{indicator} \pm p_{offset}$$

where $p_{offset}$ is determined based on various parameters of prescription lens 244 and the position $p_{indicator}$ of calibration indicators 230 (without accounting for distortion due to prescription lens 244). For example, calibrator 132 can determine $p_{offset}$ using a predetermined function:

$$p_{offset} = f_{distort}(par_{OD}, par_{OS}, p_{indicator})$$

where $f_{distort}$ is a function that relates $p_{offset}$ to various parameters of the prescription lens (e.g., $par_{OD}$, $par_{OS}$, etc.) and the position $p_{indicator}$ of calibration indicator 230 (without accounting for distortion or magnification due to prescription lens 244). In some embodiments, $par_{OD}$ is a set of parameters that relate to the user's right eye (e.g., lens power (SPH) measured in diopters, astigmatism lens power (CYL), a lens meridian that contains no cylinder power to correct astigmatism (AXIS), an amount of magnifying power applied to a bottom part of a multifocal lens to correct presbyopia, an amount of prismatic power (PRISM) measured in prism diopters to compensate for eye alignment problems, etc.), and $par_{OS}$ is a set of parameters that relate to the user's left eye (e.g., similar types of parameters as $par_{OD}$).

In some embodiments, calibrator 132 determines $p_{offset}$ using a function $f_{lens}$ selected based on various parameters of prescription lens 244:

$$p_{offset} = f_{lens}(p_{indicator})$$

where $f_{lens}$ is selected by calibrator 132 based on various prescription parameters specific to prescription lens 244 (e.g., $par_{OS}$ and/or $par_{OD}$) and relates $p_{offset}$ to $p_{indicator}$. It should be understood that $p_{offset}$ can include offset amounts (e.g., distances, angular amounts, etc.) for $p_{indicator}$ to account for distortion of fiducial light 256 caused by prescription lens 244 in multiple directions. In some embodiments, $f_{lens}$ and/or $f_{distort}$ are functions that represent or are the distortion map/profile of prescription lens 244. In some embodiments, $f_{lens}$ and/or $f_{distort}$ are functions that calibrator 132 uses to account for distortion or magnification of fiducial light 256 caused by prescription lens 244 (e.g., an inverse of the distortion map/profile of prescription lens 244).

In some embodiments, step 1010 is optional and is only performed if a prescription lens is inserted between the user's eyes 142 and display 164. In some embodiments, the various parameters specific to prescription lens 244 (e.g., $par_{OS}$ and/or $par_{OD}$) are provided by the user (e.g., through a user interface). In some embodiments, the various parameters specific to prescription lens 244 are determined or detected by calibrator 132 based on sensor data (e.g., image data) captured by imaging device 248 before and after prescription lens 244 is inserted.

Process 1000 includes comparing the position ($p_{indicator}$) of each of the one or more indicators to a reference position $p_{ref}$ (step 1012) to determine a difference $\Delta p$, according to some embodiments. In some embodiments, the reference position $p_{ref}$ of each calibration indicator 230 is a baseline position (e.g., a position of each calibration indicator 230 is at before the HMD is used). In some embodiments, the reference position $p_{ref}$ is the position $p_{indicator}$ of each indicator after various calibration settings are adjusted or a previously used position $p_{indicator}$ of each calibration indicator 230. If step 1010 is performed, $p_{adj}$ is used in step 1012 in place of the position $p_{indicator}$.

In some embodiments, step 1012 includes determining the difference $\Delta p$ between the position $p_{indicator}$ and the reference position $p_{ref}$. Calibrator 132 determines the difference $\Delta p$ as:

$$\Delta p = p_{indicator} - p_{ref}$$

or:

$$\Delta p = p_{ref} - p_{indicator}$$

or:

$$\Delta p |p_{indicator} - p_{ref}|$$

according to some embodiments.

Process 1000 includes determining if the difference $\Delta p$ is greater than or equal to a threshold value $\Delta p_{threshold}$ (step 1014), according to some embodiments. In some embodiments, step 1014 is performed by calibrator 132. In some embodiments, the threshold value $\Delta p_{threshold}$ is a predetermined value stored in memory or processing circuitry 116. When the difference $\Delta p$ exceeds (or is equal to) the threshold value $\Delta p_{threshold}$, process 1000 proceeds to step 1018. If the difference $\Delta p$ does not exceed the threshold value $\Delta p_{threshold}$, process 1000 proceeds to step 1016. In some embodiments, step 1014 is performed for each detected calibration locator 230. For example, calibrator 132 can compare changes in the position/location $p_{indicator}$ of each calibration locator 230 to the corresponding reference location $p_{ref}$ and calibrate the gaze vector if the change between $p_{indicator}$ and $p_{ref}$ exceeds the corresponding threshold value $\Delta p_{threshold}$ (e.g., step 1014, "YES") for one or more of the calibration locators 230.

In some embodiments, calibrator 132 performs steps 1012-1014 by determining a position of display 164, $p_{display}$ (e.g., x, y, z, coordinates), and an orientation $\theta_{display}$ (e.g., $\theta_1$, $\theta_2$, and $\theta_3$) of display 164 relative to imaging device 248 based on the positions/locations $p_{indicator}$ of calibration indicators 230. For example, calibrator 132 can identify the position of display 164 by calculating a centroid of calibration indicators 230. Calibrator 132 can then compare the position $p_{display}$ and orientation $\theta_{display}$ of display 164 to corresponding reference (e.g., baseline) position and orientation values. In some embodiments, calibrator 132 is configured to use the difference between the position and orientation of display 164 and the reference position and reference orientation of display 164 to determine if the gaze vector should be calibrated (e.g., step 1014, "YES") or if the gaze vector does not need to be calibrated (e.g., step 1014, "NO").

Process 1000 includes using current calibration settings (step 1016) in response to the difference $\Delta p$ being less than the threshold value $\Delta p_{threshold}$ (step 1014, "NO"), according to some embodiments. In some embodiments, step 1014 is performed by calibrator 132. In some embodiments, if the difference $\Delta p$ is not sufficient to warrant calibration, calibrator 132 continues using current calibration settings (e.g., no calibration settings, previously determine calibration settings, etc.).

Process 1000 includes calibrating eye tracking (e.g., calibrating gaze vector 302 and/or gaze location 402) using or based on the difference $\Delta p$ (step 1018), according to some embodiments. In some embodiments, step 1018 is performed by calibrator 132. Calibrator 132 can use the difference $\Delta p$ or the change in the location/position of calibration indicators 230 to adjust (e.g., change, increase or decrease, etc.) gaze vector 302 and/or gaze location 402. In some embodiments, calibrator 132 calibrates the eye tracking by determining offset amounts for gaze vector 302 and/or gaze location 402 based on the difference $\Delta p$. For example, calibrator 132 can determine an offset $\theta_{offset}$ for angles $\theta_1$ and $\theta_2$ of gaze vector 302. In some embodiments, calibrator 132 determines an offset $p_{offset}$ for gaze location 402. Calibrator 132 can determine the offset $\theta_{offset}$ using:

$$\theta_{offset} = f(\Delta p)$$

where $f$ is a function that relates $\theta_{offset}$ to $\Delta p$. In some embodiments, calibrator 132 is configured to independently adjust one or more coordinates of gaze vector 302. For example, $\theta_{offset}$ may be a vector that includes an offset amount $\theta_{1,offset}$ for angle $\theta_1$ and an offset amount $\theta_{2,offset}$ for angle $\theta_2$. Calibrator 132 can determine a calibrated gaze vector 302 by applying the offset $\theta_{offset}$ to gaze vector 302:

$$\theta_{gaze,calibrated} = \theta_{gaze} \pm \theta_{offset}$$

where $\theta_{gaze,calibrated}$ is the calibrated gaze vector 302 (e.g., $\theta_{gaze,calibrated} = \{\theta_{1,calibrated}, \theta_{2,calibrated}\} = \{(\theta_1 \pm \theta_{1,offset}), (\theta_2 \pm \theta_{2,offset})\}$), $\theta_{gaze}$ is gaze vector 302 (e.g., $\theta_{gaze} = \{\theta_1, \theta_2\}$), and $\theta_{offset}$ is the offset (e.g., $\theta_{offset} = \{\theta_{1,offset}, \theta_{2,offset}\}$), according to some embodiments.

Likewise, calibrator 132 can determine the offset $p_{offset}$ using:

$$p_{offset} = f(\Delta p)$$

where $f$ is a function that relates $p_{offset}$ to $\Delta p$, according to some embodiments. In some embodiments, calibrator 132 applies the offset $p_{offset}$ to gaze location 402:

$$p_{gaze,calibrated} = p_{gaze} \pm p_{offset}$$

where $p_{gaze,calibrated}$ is a calibrated gaze location 402, $p_{gaze}$ is gaze location 402 (e.g., in Cartesian coordinates, in polar coordinates, in spherical coordinates, etc.), and $p_{offset}$ is the offset determined based on the difference $\Delta p$. In some embodiments, calibrator 132 provides the calibrated gaze location 402 (e.g., $p_{gaze,calibrated}$) and/or the calibrated gaze vector 302 (e.g., $\theta_{gaze,calibrated}$) to eye tracker 144. In some embodiments, calibrator 132 provides the offsets $p_{offset}$ and $\theta_{offset}$ to eye tracker 144 and eye tracker 144 uses the offsets to calibrate gaze vector 302 and gaze location 402. In some embodiments, eye tracker 144 provides the calibrated gaze vector 302 (e.g., $\theta_{gaze,calibrated}$) and the calibrated gaze location 402 (e.g., $p_{gaze,calibrated}$) to image renderer 160 (e.g., as eye position 136).

Process 1000 includes determining if the difference $\Delta p$ exceeds a maximum allowable threshold value $\Delta p_{max}$ (step 1020), according to some embodiments. In some embodiments, the maximum allowable threshold value $\Delta p_{max}$ is a trigger value that indicates that the HMD should be provided to the manufacturer for calibration. In some embodiments, the maximum allowable threshold value $\Delta p_{max}$ is greater than the threshold value $\Delta p_{threshold}$. The maximum allowable threshold value $\Delta p_{max}$ can be related to or determined based on the threshold value $\Delta p_{threshold}$ (e.g., a percentage of the threshold value $\Delta p_{threshold}$, a multiple of the threshold value $\Delta p_{threshold}$, an integer multiple of the threshold value $\Delta p_{threshold}$, etc.). In some embodiments, the maximum allowable threshold value $\Delta p_{max}$ is a predetermined or stored value that calibrator 132 uses. In response to the difference $\Delta p$ exceeding (or being equal to) the maximum allowable threshold value $\Delta p_{max}$ (step 1020, "YES"), process 1000 proceeds to step 1024. In response to the difference $\Delta p$ being less than the maximum allowable threshold value $\Delta p_{max}$ (step 1020, "NO"), process 1000 proceeds to step 1022.

Process 1000 includes using current calibration settings (step 1022), according to some embodiments. In some embodiments, step 1022 is performed in response to the difference $\Delta p$ being less than the maximum allowable threshold value $\Delta p_{max}$ (step 1020, "NO"). In some embodiments, step 1022 is the same as or similar to step 1016.

Process 1000 includes prompting the user to send in the HMD for calibration (step 1024), according to some embodiments. In some embodiments, step 1024 is performed in response to the difference $\Delta p$ being greater than (or equal to) the maximum allowable threshold value $\Delta p_{max}$ (step 1020, "YES"). In some embodiments, step 1024 includes providing a visual and/or aural notification to the user that the HMD should be sent in for calibration. In some embodiments, step 1024 is performed by display 164 and/or one or more aural alert devices.

It should be understood that process 1000 can include multiple threshold values. For example, if the positions/locations of calibration indicators 230 deviates from the reference positions a first threshold amount or more, calibrator 132 can determine that the deviation of calibration indicators 230 can be accounted for by adjusting calibration parameters. If the positions/locations of calibration indicators 230 deviates from the reference position a second threshold amount or more, processing circuitry 116 can prompt the user to insert the AMD into a calibration box to attempt to recalibrate the AMD. If the positions/locations of calibration indicators 230 deviates from the reference position a third threshold amount or more, processing circuitry 116 may prompt the user to send the AMD back to the factory for re-calibration.

Server System

Figure 11:
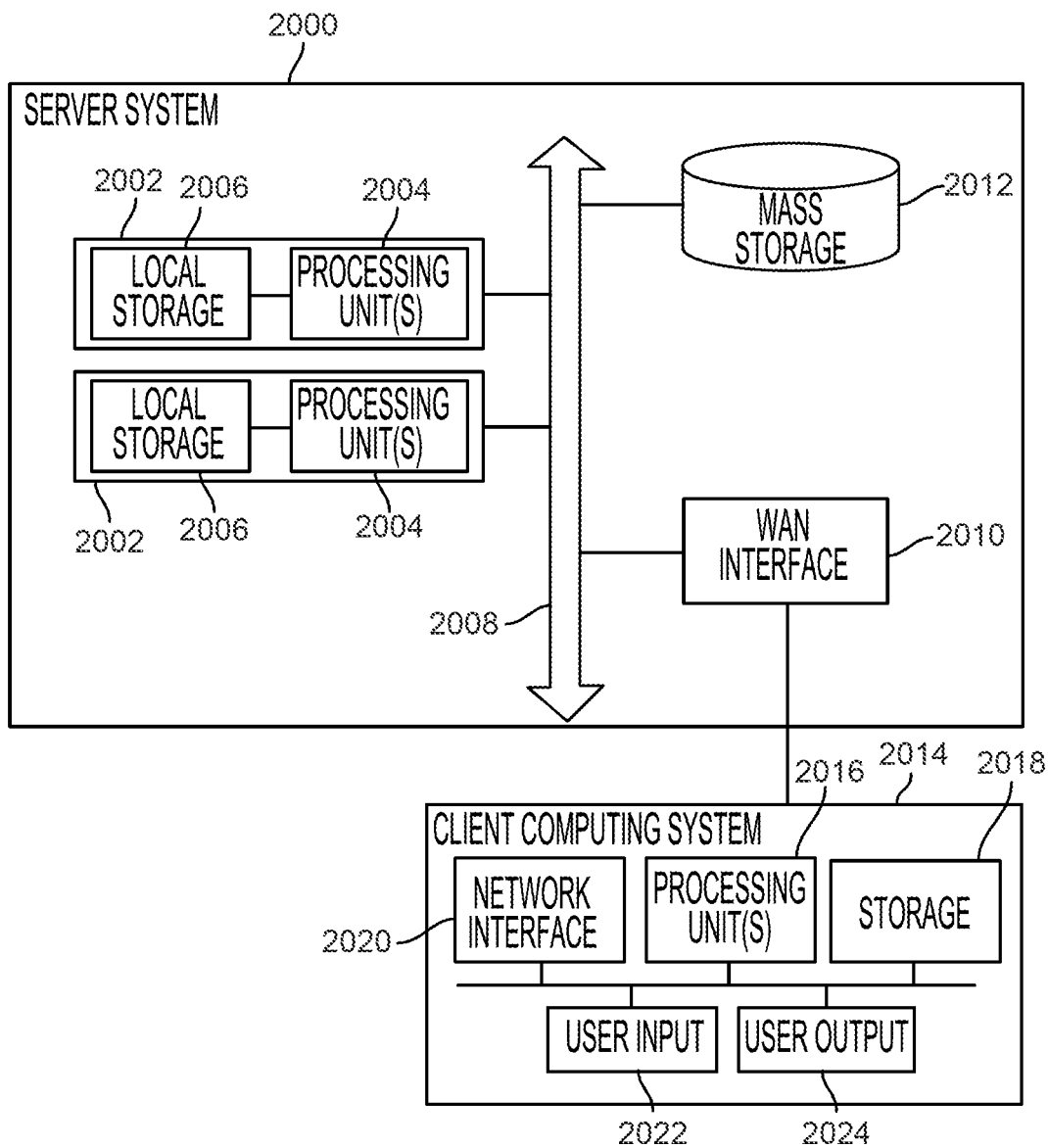
FIG. 11 is a block diagram of a computing environment that the system of FIGS. 1 and 2 can be implemented in, according to some embodiments.

Various operations described herein can be implemented on computer systems. FIG. 11 shows a block diagram of a representative server system 2000 and client computer system 2014 usable to implement the present disclosure. Server system 2000 or similar systems can implement services or servers described herein or portions thereof. Client computer system 2014 or similar systems can implement clients described herein. Each of systems 100, 200 and others described herein can incorporate features of systems 2000, 2014.

Server system 2000 can have a modular design that incorporates a number of modules 2002 (e.g., blades in a blade server); while two modules 2002 are shown, any number can be provided. Each module 2002 can include processing unit(s) 2004 and local storage 2006.

Processing unit(s) 2004 can include a single processor, which can have one or more cores, or multiple processors. Processing unit(s) 2004 can include a general-purpose primary processor as well as one or more special-purpose co-processors such as graphics processors, digital signal processors, or the like. Some or all processing units 2004 can be implemented using customized circuits, such as application specific integrated circuits (ASICs) or field programmable gate arrays (FPGAs). Such integrated circuits execute instructions that are stored on the circuit itself. Processing unit(s) 2004 can execute instructions stored in local storage 2006. Any type of processors in any combination can be included in processing unit(s) 2004.

Local storage 2006 can include volatile storage media (e.g., conventional DRAM, SRAM, SDRAM, or the like) and/or non-volatile storage media (e.g., magnetic or optical disk, flash memory, or the like). Storage media incorporated in local storage 2006 can be fixed, removable or upgradeable as desired. Local storage 2006 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 2004 need at runtime. The ROM can store static data and instructions that are needed by processing unit(s) 2004. The permanent storage device can be a non-volatile read-and-write memory device that can store instructions and data even when module 2002 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

Local storage 2006 can store one or more software programs to be executed by processing unit(s) 2004, such as an operating system and/or programs implementing various server functions such as functions of system 100, or any other system described herein, or any other server(s) associated with system 100 or any other system described herein.

"Software" refers generally to sequences of instructions that, when executed by processing unit(s) 2004 cause server system 2000 (or portions thereof) to perform various operations, thus defining one or more specific machine implementations that execute and perform the operations of the software programs. The instructions can be stored as firmware residing in read-only memory and/or program code stored in non-volatile storage media that can be read into volatile working memory for execution by processing unit(s) 2004. Software can be implemented as a single program or a collection of separate programs or program modules that interact as desired. From local storage 2006 (or non-local storage described below), processing unit(s) 2004 can retrieve program instructions to execute and data to process in order to execute various operations described above.

In some server systems 2000, multiple modules 2002 can be interconnected via a bus or other interconnect 2008, forming a local area network that supports communication between modules 2002 and other components of server system 2000. Interconnect 2008 can be implemented using various technologies including server racks, hubs, routers, etc.

A wide area network (WAN) interface 2010 can provide data communication capability between the local area network (interconnect 2008) and a larger network, such as the Internet. Conventional or other activities technologies can be used, including wired (e.g., Ethernet, IEEE 802.3 standards) and/or wireless technologies (e.g., Wi-Fi, IEEE 802.11 standards).

Local storage 2006 can provide working memory for processing unit(s) 2004, providing fast access to programs and/or data to be processed while reducing traffic on interconnect 2008. Storage for larger quantities of data can be provided on the local area network by one or more mass storage subsystems 2012 that can be connected to interconnect 2008. Mass storage subsystem 2012 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 2012. Additional data storage resources may be accessible via WAN interface 2010 (potentially with increased latency).

Server system 2000 can operate in response to requests received via WAN interface 2010. For example, one of modules 2002 can implement a supervisory function and assign discrete tasks to other modules 2002 in response to received requests. Conventional work allocation techniques can be used. As requests are processed, results can be returned to the requester via WAN interface 2010. Such operation can generally be automated. WAN interface 2010 can connect multiple server systems 2000 to each other, providing scalable systems capable of managing high volumes of activity. Conventional or other techniques for managing server systems and server farms (collections of server systems that cooperate) can be used, including dynamic resource allocation and reallocation.

Server system 2000 can interact with various user-owned or user-operated devices via a wide-area network such as the Internet. An example of a user-operated device is shown in FIG. 11 as client computing system 2014. Client computing system 2014 can be implemented, for example, as a consumer device such as a smartphone, other mobile phone, tablet computer, wearable computing device (e.g., smart watch, eyeglasses), desktop computer, laptop computer, and so on.

For example, client computing system 2014 can communicate via WAN interface 2010. Client computing system 2014 can include conventional computer components such as processing unit(s) 2016, storage device 2018, network interface 2020, user input device 2022, and user output device 2024. Client computing system 2014 can be a computing device implemented in a variety of form factors, such as a desktop computer, laptop computer, tablet computer, smartphone, other mobile computing device, wearable computing device, or the like.

Processor 2016 and storage device 2018 can be similar to processing unit(s) 2004 and local storage 2006 described above. Suitable devices can be selected based on the demands to be placed on client computing system 2014; for example, client computing system 2014 can be implemented as a "thin" client with limited processing capability or as a high-powered computing device. Client computing system 2014 can be provisioned with program code executable by processing unit(s) 2016 to enable various interactions with server system 2000 of a message management service such as accessing messages, performing actions on messages, and other interactions described above. Some client computing systems 2014 can also interact with a messaging service independently of the message management service.

Network interface 2020 can provide a connection to a wide area network (e.g., the Internet) to which WAN interface 2010 of server system 2000 is also connected. Network interface 2020 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 2022 can include any device (or devices) via which a user can provide signals to client computing system 2014; client computing system 2014 can interpret the signals as indicative of particular user requests or information. User input device 2022 can include any or all of a keyboard, touch pad, touch screen, mouse or other pointing device, scroll wheel, click wheel, dial, button, switch, keypad, microphone, and so on.

User output device 2024 can include any device via which client computing system 2014 can provide information to a user. For example, user output device 2024 can include a display to display images generated by or delivered to client computing system 2014. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 2024 can be provided in addition to or instead of a display. Examples include indicator lights, speakers, tactile "display" devices, printers, and so on.

Configuration of Exemplary Embodiments

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A head wearable display comprising:
   a fiducial associated with the head wearable display;
   an imaging device configured to provide image data of tracking light associated with an eye of a user and fiducial light associated with positions of the fiducial relative to the imaging device; and
   processing circuitry configured to:
      identify a position of the fiducial using the image data of the fiducial light; and
      determine a gaze direction using the position and the image data of the tracking light.

2. The head wearable display of claim 1, further comprising:
   one or more emitters configured to emit light for eye tracking, wherein the light from the emitter is directed toward an eye of the user and reflected to the imaging device;
   wherein the imaging device is disposed on a structural member to receive light reflected from a combiner of the head wearable display, the imaging device being coupled to the combiner, the structural member comprising a temple arm;
   wherein the imaging device is oriented in a direction towards the combiner such that the imaging device is configured to obtain image data of an inward facing surface of the combiner.

3. The head wearable display of claim 1, wherein the processing circuitry is configured to determine or calibrate the gaze direction to account for a change in at least one of a position or an orientation of the imaging device relative to a combiner of the head wearable display.

4. The head wearable display of claim 1, wherein the fiducial is an active indicator or a passive indicator, wherein the active indicator is a device configured to actively emit light for detection by the imaging device and the passive indicator is configured to reflect surrounding light for detection by the imaging device.

5. The head wearable display of claim 4, wherein the active indicator is configured to emit light that is outside of a spectrum of light visible to the user or wherein the passive indicator is a conductor disposed in a combiner of the head wearable display configured to be disposed in front of the eye.

6. The head wearable display of claim 1, wherein the fiducial is positioned at least one of:
   on an inward facing surface of a combiner of the head wearable display;
   on an outward facing surface of the combiner;
   between the inward facing surface of the combiner and the outward facing surface of the combiner; and
   along a structural frame member that at least partially surrounds the combiner.

7. The head wearable display of claim 1, wherein the processing circuitry is configured to:
   determine a position of each of a plurality of the fiducial;
   compare the position of each of the plurality of the fiducial to a corresponding reference position to determine a change in at least one of a position or an orientation of the imaging device relative to a combiner of the head wearable display; and
   determine the gaze direction at least in part based on the position of at least one of the plurality of fiducials.

8. The head wearable display of claim 7, wherein the processing circuitry is configured to determine the gaze direction based at least in part on the position of at least one of the plurality of fiducials in response to a determination that the change in at least one of the position or the orientation of the imaging device relative to the combiner exceeds a predetermined amount.

9. The head wearable display of claim 1, further comprising a prescription lens insert, wherein the processing circuitry is configured to:
   obtain a distortion map associated with the prescription lens insert; and
   determine the gaze direction based at least in part on the distortion map and the image data to account for a distortion of light passing through the prescription lens insert.

10. A method, comprising:
    determining an indication of a position of a fiducial on a head wearable optical device based at least on fiducial light data received from an image device that provides tracking data of an eye of a user; and
    determining a gaze direction at least in part using the indication of the position of the fiducial in the fiducial light data; and
    provide imagery to the user using the gaze direction.

11. The method of claim 10, further comprising:
    comparing the position of the fiducial to a corresponding reference position to determine a change in at least one of a position or an orientation of the imaging device relative to the combiner;
    determining the gaze direction based at least in part on the position of at least one of the fiducial and eye tracking in response to a difference between the position of the fiducial and the corresponding reference position exceeding a predetermined threshold value.

12. The method of claim 10, wherein determining the gaze direction comprises determining the gaze direction at least in part using the fiducial light data to account for at least one of a change in position or a change in orientation of a combiner relative to the imaging device.

13. The method of claim 10, further comprising:
obtaining a distortion map associated with a prescription lens insert; and
adjusting the fiducial light data based on the distortion map associated with the prescription lens insert to account for a distortion of light passing through the prescription lens insert.

14. A device comprising:
a prescription lens insert positioned between a user's eye and an image displayed by the device;
an imaging device configured to provide image data of received tracking light associated with an eye of a user and fiducial light associated with positions of a fiducial relative to the imaging device; and
processing circuitry configured to:
identify a position of the fiducial using the image data of the fiducial light;
calibrate a gaze direction of the user's eye based at least in part on the position of the fiducial and the image data of the tracking light; and
determine, for the prescription lens insert, a distortion map to account for a distortion of light passing through the prescription lens insert.

15. The device of claim 14, wherein the imaging device is coupled with a structural member that is coupled with a combiner and is oriented in a direction towards the combiner such that the imaging device is configured to obtain image data of an inward or eye facing surface of the combiner.

16. The device of claim 14, wherein the image data includes an indication of the fiducial and the fiducial is an active indicator or a passive indicator, wherein active indicators are configured to actively emit light for detection by the imaging device and passive indicators are configured to reflect surrounding light for detection by the imaging device.

17. The device of claim 16, wherein the active indicators are configured to emit light that it outside of a spectrum of light visible to a user.

18. The device of claim 16, wherein the processing circuitry is configured to:
determine a position of each of a plurality of the fiducial;
compare the position of each of the plurality of fiducials to a corresponding reference position to determine a change in position of at least one of the plurality of fiducials; and
calibrate the gaze direction based at least in part on the position of at least one of the plurality of fiducials.

19. The device of claim 18, wherein the corresponding reference position is at least one of a baseline position of an associated one of the one or more fiducials or a previously determined position of the associated one of the one or more fiducials.

20. The device of claim 14, further comprising one or more emitters fixedly coupled with the device, wherein the one or more emitters are configured to emit light in a direction towards the user's eye, wherein the light emitted by the one or more emitters travels from the one or more emitters, to the user's eye, to the combiner, and to the imaging device.

* * * * *